(12) United States Patent
Bianchi et al.

(10) Patent No.: US 9,568,115 B2
(45) Date of Patent: Feb. 14, 2017

(54) SAFETY DEVICE AGAINST FLUID LEAKS FOR HOUSEHOLD APPLIANCES

(75) Inventors: Luciano Bianchi, Casale Monferrato (IT); Paolo Savini, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 567 days.

(21) Appl. No.: 14/111,922

(22) PCT Filed: Apr. 12, 2012

(86) PCT No.: PCT/IB2012/051793
§ 371 (c)(1),
(2), (4) Date: Jan. 23, 2014

(87) PCT Pub. No.: WO2012/140592
PCT Pub. Date: Oct. 18, 2012

(65) Prior Publication Data
US 2014/0144521 A1 May 29, 2014

(30) Foreign Application Priority Data
Apr. 15, 2011 (IT) .............................. TO2011A0337

(51) Int. Cl.
*F16K 17/36* (2006.01)
*A47L 15/42* (2006.01)
*D06F 39/08* (2006.01)

(52) U.S. Cl.
CPC .............. *F16K 17/36* (2013.01); *A47L 15/421* (2013.01); *A47L 15/4217* (2013.01);
(Continued)

(58) Field of Classification Search
CPC .... F16K 17/36; A47L 15/421; A47L 15/4217; A47L 3501/01; Y10T 137/5762; D06F 39/081
(Continued)

(56) References Cited

U.S. PATENT DOCUMENTS

| | | | |
|---|---|---|---|
| 6,247,489 B1 * | 6/2001 | Maskell et al. | F16K 15/03 137/269.5 |
| 7,798,165 B2 * | 9/2010 | McClung, Jr. | F16K 17/34 137/312 |

FOREIGN PATENT DOCUMENTS

| | | |
|---|---|---|
| DE | 2940215 A1 | 4/1981 |
| DE | 3618258 A1 | 2/1987 |

(Continued)

OTHER PUBLICATIONS

International Search Report for PCT/IB2012/051793 dated Dec. 20, 2012.

*Primary Examiner* — Kevin Lee
(74) *Attorney, Agent, or Firm* — Heslin Rothenberg Farley & Mesiti P.C.; Victor A. Cardona, Esq.

(57) ABSTRACT

An anti-flooding safety device includes two connection bodies, a valve arrangement that includes a valve member, a retention member for withholding the valve member in a respective opening position, and an inner hose and an outer hose impermeable to water. The inner hose hydraulically connects the two connection bodies and extends at least in part within the outer hose so that defined between the two hoses is a gap designed to withhold inside it any possible leaking water. A connection body has a control chamber that is at least in part delimited by a movable element, and a control member is coupled to the movable element so that a displacement of the latter will cause a displacement of the control member towards a respective position of release, wherein the valve member is free to pass into its closing position. The gap is in fluid communication with the control chamber, to obtain a substantially closed volume therewith.

20 Claims, 14 Drawing Sheets

(52) U.S. Cl.
CPC ........ *D06F 39/081* (2013.01); *A47L 2401/14* (2013.01); *A47L 2401/17* (2013.01); *A47L 2501/01* (2013.01); *Y10T 137/5762* (2015.04)

(58) Field of Classification Search
USPC ........................................................ 137/312
See application file for complete search history.

(56) References Cited

FOREIGN PATENT DOCUMENTS

| | | |
|---|---|---|
| EP | 0333245 A2 | 9/1989 |
| EP | 0474569 A1 | 3/1992 |
| EP | 2290152 A1 | 3/2011 |
| FR | 2596130 A1 | 9/1987 |

\* cited by examiner

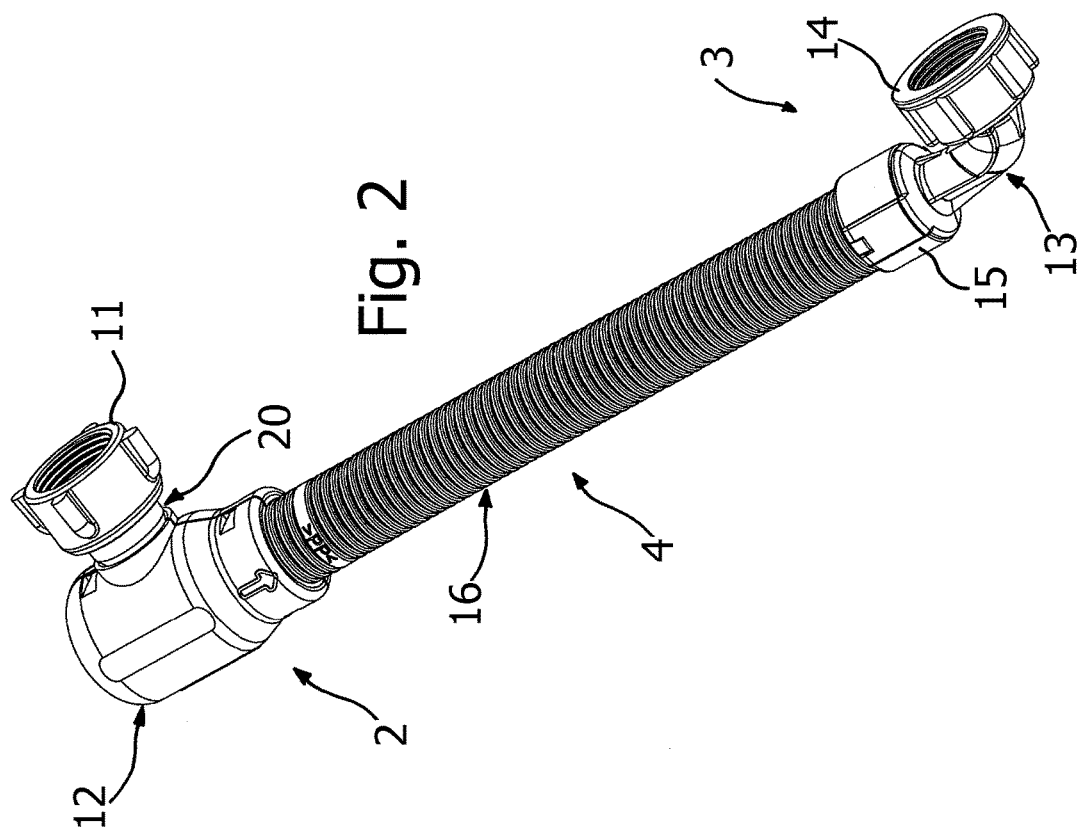
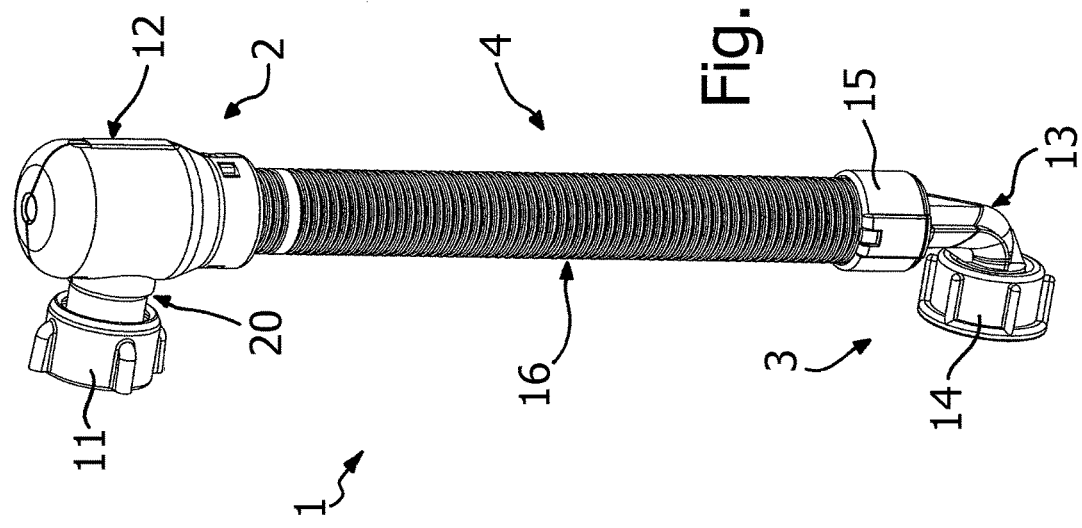

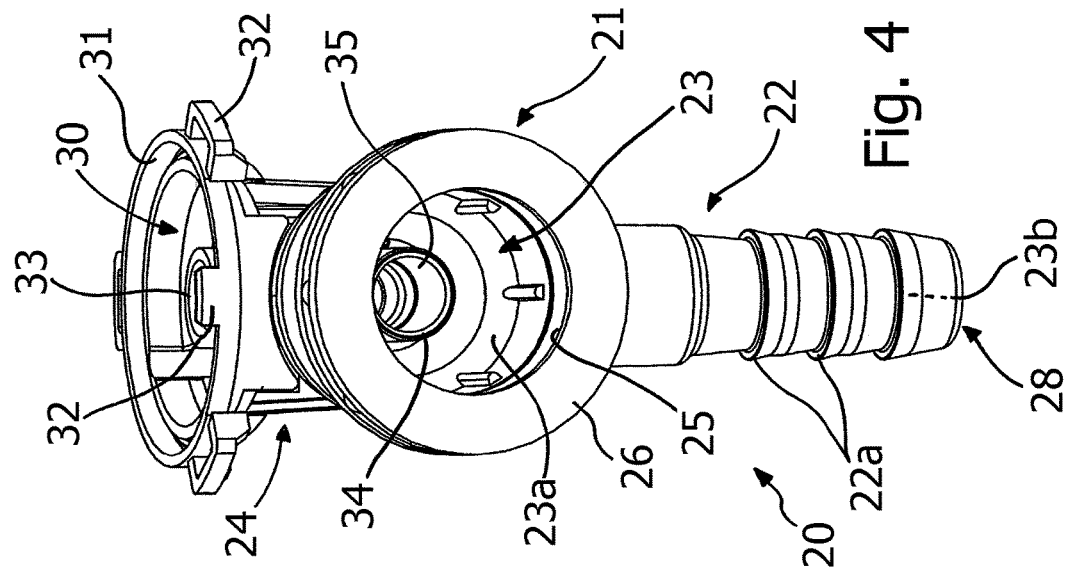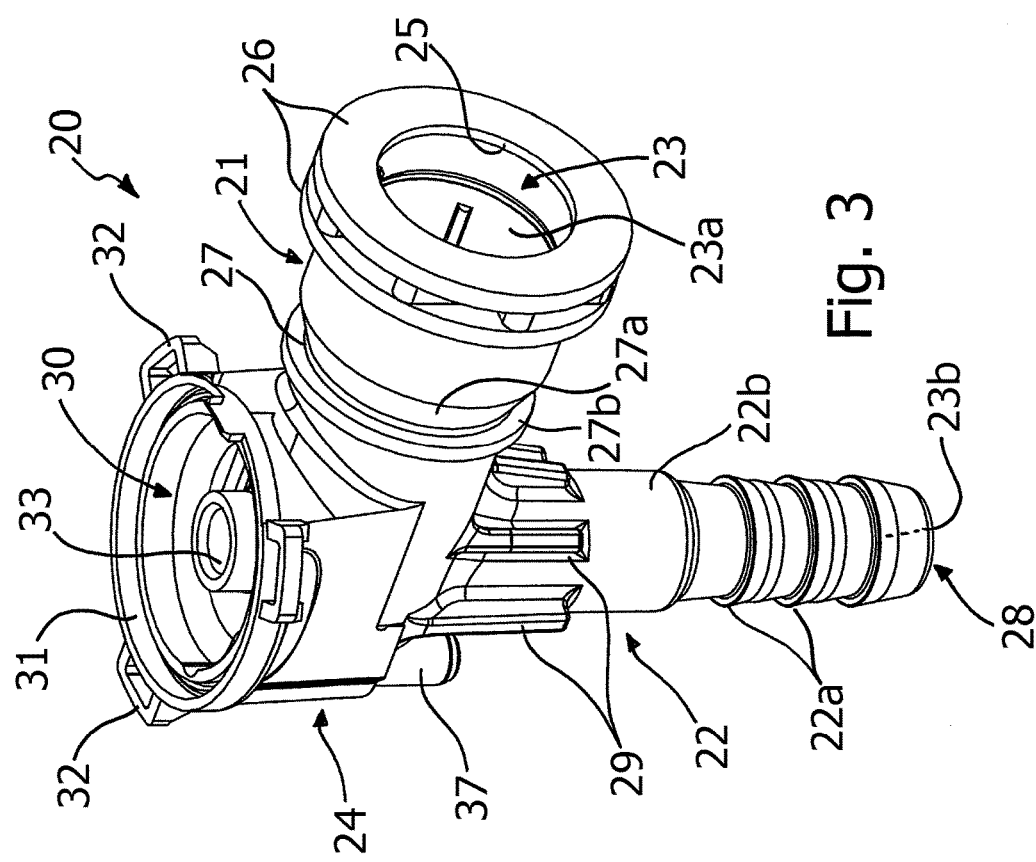

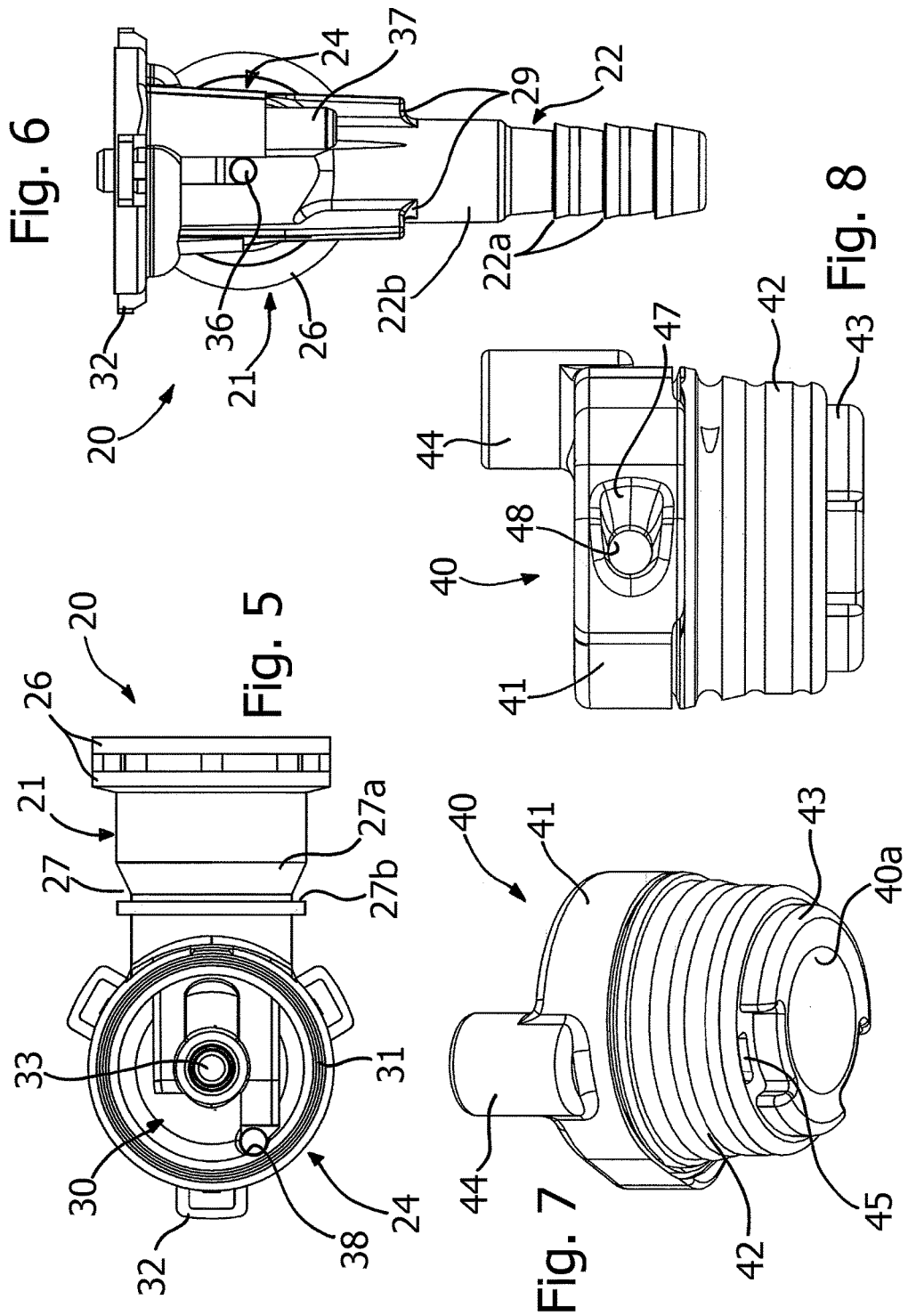

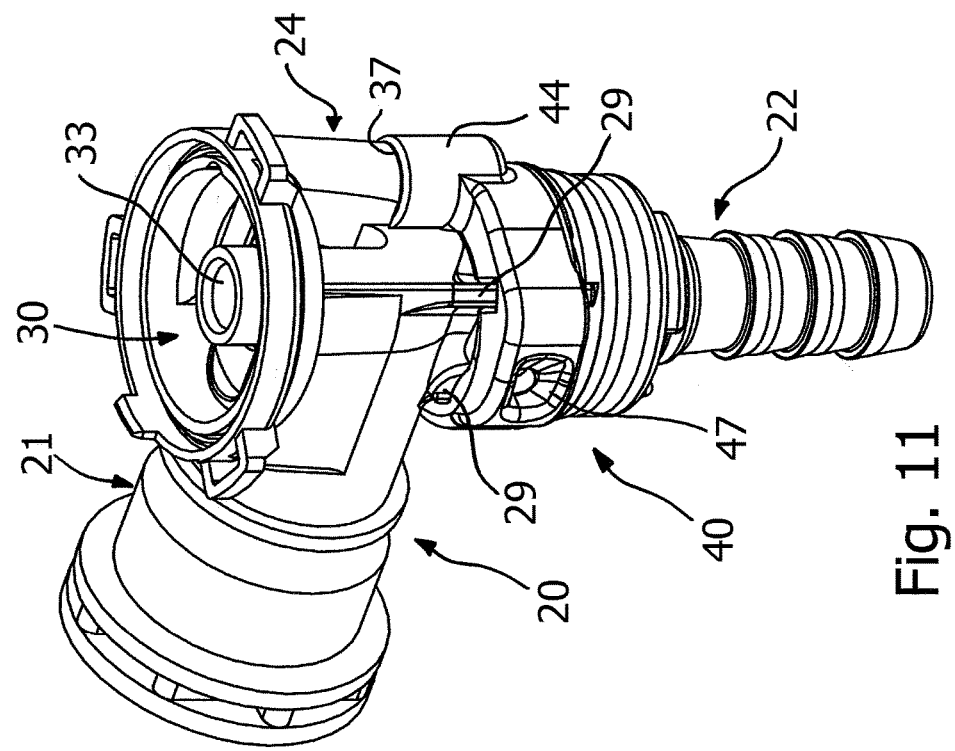
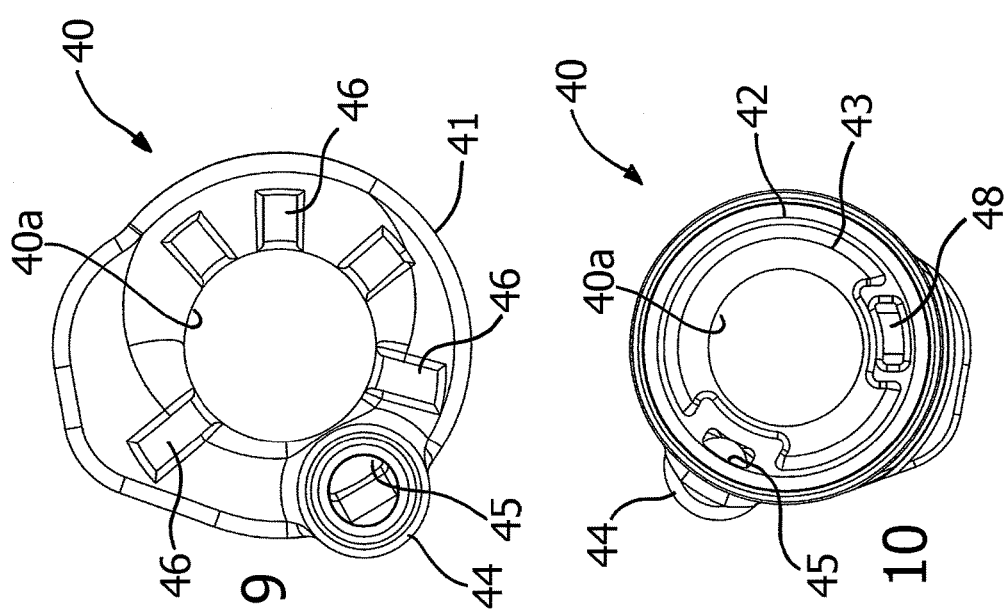

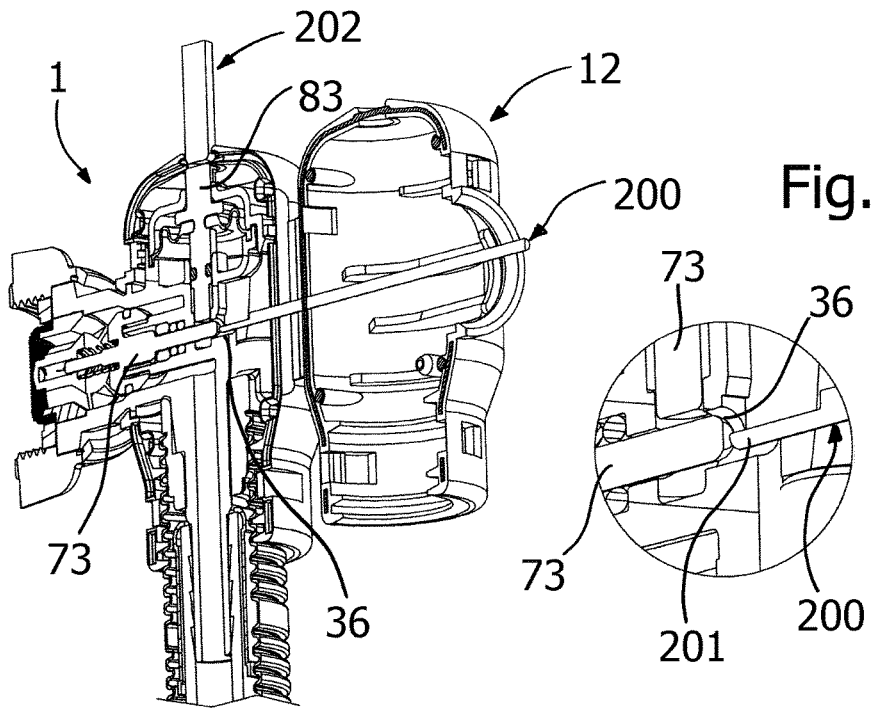
Fig. 20
Fig. 19
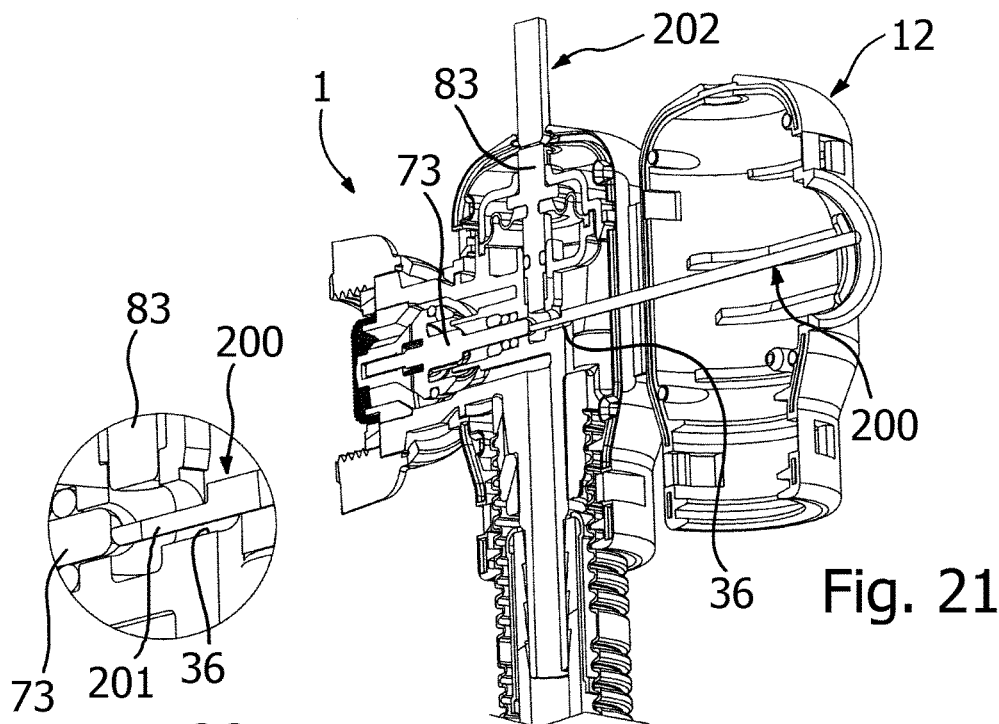
Fig. 21
Fig. 22

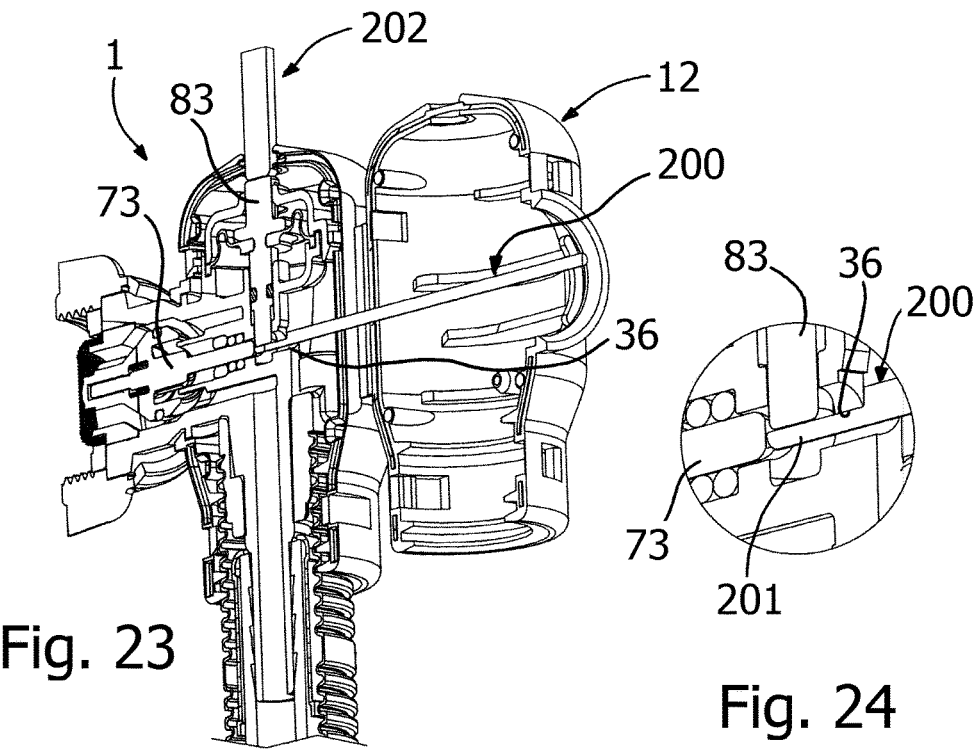
Fig. 23
Fig. 24
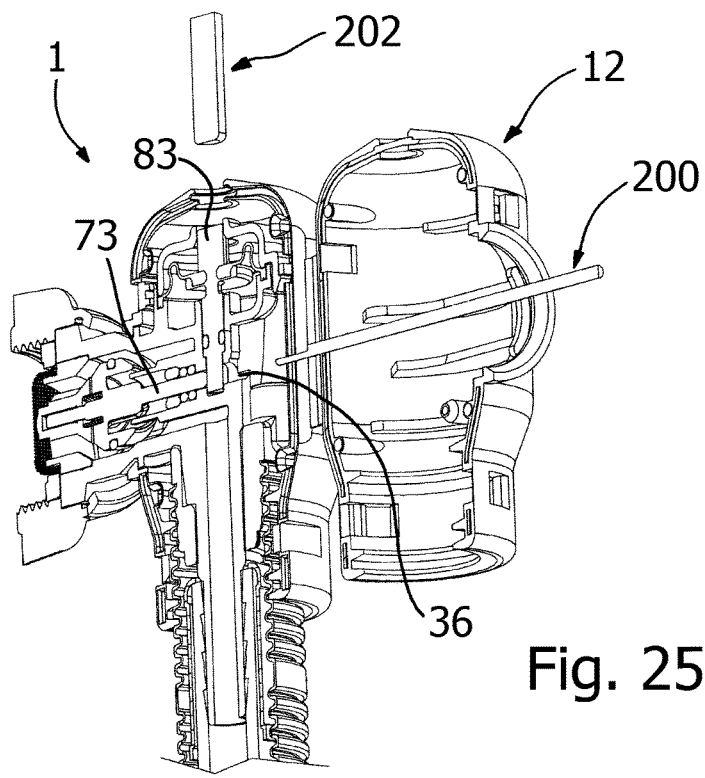
Fig. 25

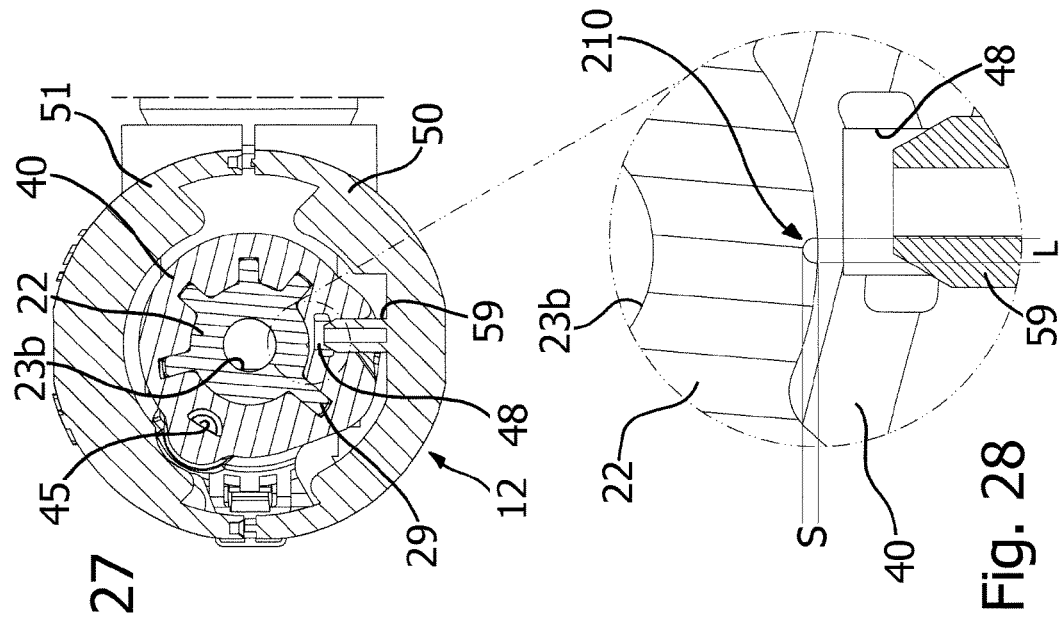
Fig. 27
Fig. 28
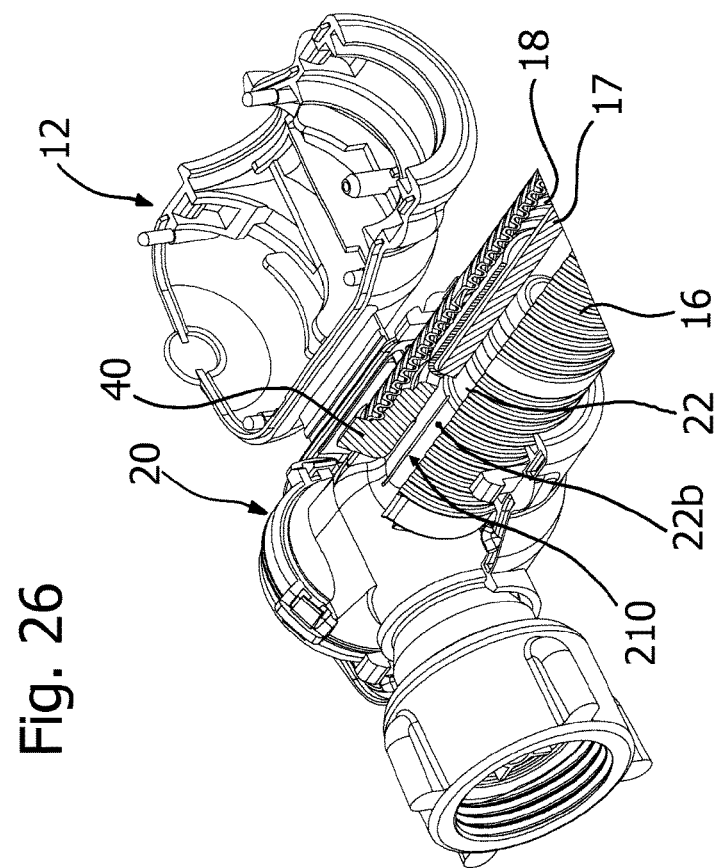
Fig. 26

SAFETY DEVICE AGAINST FLUID LEAKS FOR HOUSEHOLD APPLIANCES

CROSS REFERENCE TO RELATED APPLICATIONS

This application is a 371 National Phase of PCT International Application No. PCT/IB2012/051793 filed on Apr. 12, 2012, and published in English as WO 2012/140592 A3 on Oct. 18, 2012, which claims priority to Italian Patent Application No. TO2011A000337 filed on Apr. 15, 2011, the entire disclosures of which are incorporated herein by reference.

FIELD OF THE INVENTION

The present invention relates to a safety device against leakage of a fluid, in particular an anti-flooding safety device, designed for connection between a source of the fluid and an apparatus that uses said fluid, such as a household appliance.

More in particular, the invention regards a said safety device of the type that comprises:
- a first connection body and a second connection body, which define, respectively, a first duct and a second duct for the fluid;
- at least one valve arrangement on at least one of the first and second connection bodies, including a valve member mounted displaceable and designed to assume a position of opening and a position of closing of at least one of the first and second ducts;
- control means, for withholding the valve member in the respective opening position, the control means being operable for assuming a respective position of release of the valve member; and
- an inner flexible hose and an outer flexible hose impermeable to the fluid, wherein the inner hose connects in fluid communication the first duct and the second duct and extends longitudinally at least in part within the outer hose so that defined between at least part of the two hoses is a gap having a proximal end and a distal end, the gap being substantially closed at said end for withholding inside it any possible leaking fluid.

PRIOR ART

Safety devices for household appliances of the type referred to are widely known, in particular for use in laundry-washing machines and dish-washers. Typically, in antiflooding devices the inner hose is designed to convey the water from a connection of the mains water supply into the household appliance, whereas the outer hose has the function of preventing any possible leakage of water from the inner hose from possibly being dispersed in the domestic environment, causing flooding. For this purpose, one of the two connection bodies, defined hereinafter as "valve body", is equipped with a valve arrangement, including a valve element that closes the duct internal to the body itself, in the case where a leakage of water is detected.

In a first type of known solutions, the outer hose and the gap are open at the bottom, i.e., at the distal end, inside the household appliance, where a tray is provided for collecting any possible leakage of water. Provided within said tray is a sensor device that can be of an electromechanical type (for example, a float with a microswitch associated thereto) or else of a mechanical type (based upon the expansion of an anhydrous sponge, which increases in volume when it comes into contact with a liquid). Irrespective of the type of sensor, the arrangement is such that, upon detection of water within the tray, the sensor generates a control signal (electrical, pneumatic, or mechanical, according to the cases), which brings about switching of the valve arrangement provided in the valve body, and hence closing of the duct for inflow of the water. In this way, in the presence of a failure of the inner hose for delivering the water, any further inflow and hence the risk of flooding is prevented. These safety devices present the advantage of interrupting the supply of water also in the case where the leakage is not due to a failure of the inner hose, but rather to failures of different hydraulic components mounted inside the household appliance. On the other hand, said devices presuppose a certain specific pre-arrangement of the household appliance; the devices themselves must be configured according to the structure of the household appliance since they have to be coupled thereto in a substantially complementary way. In addition, the fact that said devices comprise substantially two units, connected to one another but installed in different points (the valve body with the two hoses, on one side, and the leakage-sensor assembly, on the other) renders these devices relatively complicated and costly and with a greater risk of defectiveness. The fact that the actuation control comes from a point that is remote from the valve arrangement may be a reason for critical situations, above all when said signal is produced by mechanical components.

Antiflooding safety devices of a second type have also been proposed, which are simpler than the previous ones and do not presuppose a particular pre-arrangement of the household appliance. In this second type of devices, the gap defined between the inner hose and the outer hose is substantially closed at the two ends so that it can accumulate any possible leakage of water from the inner hose. Devices of this type base their operation on the use of an anhydrous sponge, which is operatively set in a position corresponding to the first connection body, in fluid communication with the gap. The anhydrous sponge is usually coupled to an arrest member, mounted movable between a position of withholding and a position of release of the valve element of a mechanical valve. When the sponge is in its anhydrous condition, the aforesaid arrest member withholds the valve element in the position of opening of the duct. In the event of a leakage, the water that has collected in the gap rises until it comes into contact with the sponge, causing an increase in volume thereof and hence a displacement of the arrest member towards the position of release so that the valve element of the valve can close the duct for inflow of water under the pressure of the water. An antifiooding safety device of this type is known, for example, from the German patent No. DE 3618258 C filed in the name of the present applicant, on which the preamble of Claim 1 is based (said document moreover describes safety devices of the first type referred to above).

The devices of the second type referred to are decidedly less expensive than the previous ones and can be installed in a simple and fast way on any household appliance, even one not provided for the purpose, and also subsequent to purchase of the household appliance itself. On the other hand, given that said devices are based upon the use of an anhydrous sponge, they presuppose that the water that leaks is collected in the gap and rises along the same until it reaches the sponge. This presupposes that the volume of the gap and of the region of the device where the sponge operates is in any case open to a significant extent towards the external environment to enable venting of air that allows the water to rise up the gap. For this purpose, usually the device has a housing body having at least one vent opening. The presence and dimensions of such an opening enable, however, also inlet within the device of possible humidity, and said problem is particularly felt in cases where the household appliance, with the corresponding antiflooding safety device, is located in a place particularly subject to humidity (consider the case of a dish-washer in a kitchen or of a laundry-washing machine in a bathroom, where frequently—for example, in the course of cooking food or taking a shower, respectively—a lot of steam develops). Inlet of humidity into the device can hence progressively jeopardize proper operation of the device, for example, causing the valve arrangement to close even in the absence of an effective leakage of water. Also the occasional spilling of water from outside onto the body of the device (consider a device mounted on a dish-washer freely installed in a kitchen) can cause infiltration such as to lead to undesirable triggering of the safety device. In order to reduce said problems it has been proposed to associate a porous sintered element to the vent opening.

Said solution complicates, however, production of the device, and the aforesaid membrane can constitute a point of accumulation of dust and dirt, to the point where proper operation of the device is jeopardized in the event of effective triggering thereof. Alternatively, it has also been proposed to stop the vent opening with a plug, such as a spherical body, designed to be expelled from the opening itself by the pressure generated in the event of leakage. In addition to rendering production of the device more complicated, in this solution there is the risk—above all with the passage of time—of the spherical body remaining jammed permanently in the corresponding seat, also in this case jeopardizing proper operation of the device; said solution moreover implies reduced dimensional tolerances of fit between the plug and the corresponding seat.

OBJECT AND SUMMARY OF THE INVENTION

The object of the present invention is to solve the aforesaid drawbacks of the known art and provide a safety device against leakage of fluid, in particular an antiflooding safety device of the second type referred to, which will be simple and economically advantageous to produce, as well as being precise and reliable in operation.

The above and yet other purposes, which will emerge more clearly in what follows, are achieved according to the present invention by a safety device having the characteristics specified in Claim 1. Preferential characteristics are specified in the dependent claims. The claims form an integral part of the technical teaching provided herein in relation to the invention.

In brief, according to the invention, in a safety device as described at the start:
at least one of the first connection body and the second connection body has a control chamber that comprises and/or is at least in part delimited by a movable element;
the control means comprise a control member associated to the movable element; and
the gap is in fluid communication with the control chamber to form therewith a substantially closed volume, or anyway such that an internal leakage of fluid, towards the gap or the aforesaid substantially closed volume, will cause a movement of the movable element, and therewith actuation or displacement of the control member towards a position of release of the valve member, or a control of release of the latter, where the valve member can assume autonomously, i.e., independently of the control member, the respective position of closing of the at least one of the first and second ducts.

According to the invention, control or release of the valve member is generated directly by the leaking fluid, in a pneumatic or else hydraulic or else combined (hydro-pneumatic) way, and acts rapidly on the control member by means of the aforesaid movable element, preferably represented by an elastic diaphragm. A leakage of water inside the device, for example, from the inner hose to the gap, in fact generates an over-pressure inside the gap itself or inside the substantially closed volume that comprises it, said over-pressure being transferred to the control chamber, with consequent bending of the diaphragm that produces displacement of the control member: consequently, the valve member is released and can close the main duct for inflow of the water. In certain conditions of installation, on the other hand—for example, when the device is installed with the two hoses set substantially horizontal—the leaking water itself can reach the control chamber, thus bringing about bending of the diaphragm hydraulically, instead of pneumatically.

In any case, operation of the device is totally independent of the conditions of environmental humidity, thus overcoming the problems typical of the prior art referred to above. Safety closing can be triggered faster, it not being necessary to wait for the leaking water to fill the entire gap to come into contact with the anhydrous sponge of the prior art and/or for the sponge to dilate to the point where it manages to exert a force or a displacement such as to cause triggering of the safety mechanism.

In this regard, consider that the devices having sponges, even though they may be relatively fast, typically involve a triggering time comprised between 10 and 30 seconds, with an albeit minimal leakage of water towards the outside (from approximately 0.2 l to approximately 0.5 l). Actuation using a sponge basically entails a sequence of steps. First, the sponge starts to get wet in its outer part and to increase in volume; next, as the sponge increases in volume, the water tends to penetrate progressively into the sponge, which further increases in volume. However, said further expansion is hindered by the reaction or blocking means of the valve member, which delays infiltration of the fluid towards the centre of the sponge. It follows that the triggering times can be affected, not only by the time necessary for the water to reach the sponge, but also by other factors, such as the geometry of the sponge, the shape of the corresponding container, and the surfaces effectively free to get wetted. In addition, in order to obtain a greater force, it is necessary for the anhydrous sponge to have a larger cross section or base, whereas to achieve an adequate travel useful for its expansion a greater thickness of the sponge is required, with consequent increase in costs and longer triggering time (or, on the other hand, greater risk of spontaneous expansion such as might develop a force that might cause faulty triggering of the safety mechanism).

According to a version considered preferential, thanks to the presence of means for accumulating mechanical energy that constantly force the valve member into its closing position, operation of the device according to the invention is not even affected by the conditions of pressure of the mains water supply. In a domestic mains water supply, there may in fact be present also different pressures (for example, between 0.2 bar and 10 bar) or there may occur occasionally drops in pressure or, in certain circumstances, even negative pressure. The presence of means for accumulating mechanical energy prevents, in extremely unfavourable conditions— such as triggering of the safety mechanism with low mains pressure or a triggering followed by a negative pressure in the mains supply—the valve member of the valve arrangement from re-opening temporarily, thus possibly enabling a further inflow of water to the household appliance.

In a preferred embodiment, the aforesaid movable element is constituted by a diaphragm or similar elastically deformable element, which can bend between an inoperative position and an operative position. The control member is coupled to the diaphragm so that any bending of the diaphragm from the inoperative position into the operative position causes a displacement of the control member towards the respective position of release of the valve member. This type of solution contributes to increasing the rapidity of triggering of the safety device.

In the device according to the invention the valve arrangement is advantageously of a bistable type, i.e., designed to maintain at least two stable positions, and in particular a stable position of opening in the absence of leakage of the fluid and a stable position of closing following upon a leak. Said stable positions are obtained via the retention means represented by the control member coupled to the movable element or diaphragm and via the means for accumulating energy that force the valve member, respectively.

In one embodiment, operatively set between the outer hose and the connection body are first sealing means, which define or comprise at least one connection passage for connecting the gap to the control chamber.

In this way, the gap can be substantially closed at the proximal end or upper end thereof, leaving in any case a passage of relatively restricted cross section, to facilitate detection of the over-pressure by the elastic diaphragm of the control chamber, or to enable passage of the fluid as far as the latter. In a preferred embodiment, the aforesaid first sealing means comprise at least one substantially annular sealing member, which is fitted on a portion of the connection body and on which there is in turn fitted a proximal end portion of the outer hose.

The first sealing means referred to above—like the aforesaid diaphragm—are preferably made of a mouldable elastic material, such as an elastomer, a rubber, or a silicone. Merely by way of example, materials that can be used are the thermoplastic elastomers TPE or TPV (for example, the ones known by the commercial names Forpren® or Santoprene®), EPDM rubbers, NBR rubbers, SBR rubbers, FPM rubbers (for example, those known by the commercial names Viton®, Fluorel®, Technoflon®), or chloroprene rubbers (for example, those known by the commercial names Neoprene(r), Baypren(r), Butaclor(r)).

Preferably, the connection body defines an auxiliary duct that opens into the control chamber, fitted to which in a fluid-tight way is the gap and/or an outlet of the aforesaid connection passage of the sealing means, the inlet of the latter in turn opening into the gap. In one embodiment, the sealing member has means for coupling and/or fixing to a duct connected to the control chamber, such as the aforesaid auxiliary duct, where in particular the connection passage is in communication with or is associated to said coupling and/or fixing means. Preferably, the aforesaid connection passage extends parallel to a through opening of the sealing member, which sealingly houses a portion of the connection body, said portion including at least one respective axially extended stretch of the corresponding duct for the fluid.

As will emerge more clearly hereinafter, the provision of the sealing means, and in a preferred way of the aforesaid annular sealing member, as well as of the aforesaid auxiliary duct defined by the connection body, enable, if need be, operation of the device also in the complete absence of an outer casing. This proves particularly useful during production of the device, in particular during testing. Consider that, in the solutions according to the known art, the safety device is typically provided with an additional casing, which must be sealingly mounted on the valve body, and into which any leakage of water is conveyed: in these known devices there must be provided both a hydraulic seal between the additional casing and the valve body and one between the outer hose and the casing.

In a preferential embodiment, the control member has a portion that projects from the movable element or diaphragm, outside the control chamber, with said projecting portion that is at least in part visible through a window or an inspection hole of a housing body of the device. In this way, the control member functions also as means for signalling the operative state of the safety device. The control member and the signalling means are preferably made as a single piece, with the possible addition of end elements and/or sealing elements.

In a particularly advantageous embodiment, the duct of the connection body includes two axially extended stretches, which extend transverse with respect to one another, in particular substantially perpendicular to one another. In practice, in this embodiment, the inlet and the outlet of the connection body are located in substantially orthogonal positions: this arrangement proves advantageous when the connection body in question is the one designed for connection with a source of the fluid, for example, a tap. In addition to obtaining a particularly compact configuration of the device, this orientation also facilitates installation of the device in various situations, at the same time reducing bends in the two hoses when the device itself is installed. Very preferably, in such an embodiment, the valve member of the valve arrangement can be displaced between the respective opening and closing positions in a direction that is substantially perpendicular to the longitudinal axis of the inner hose, or of the proximal end thereof connected to the connection body. Preferably, moreover, also the control member extends axially in a direction perpendicular to that of displacement of the valve member, in particular in an axial direction with respect to the aforesaid second stretch of the duct of the first connection body. The valve member is preferably made as a single piece, with the possible addition of end elements and/or sealing elements.

The sealing means set between the outer hose and the first connection body preferably also comprise an auxiliary opening that is in fluid communication with the gap and is stopped by a corresponding closing element.

This auxiliary opening proves particularly advantageous in so far as it can be exploited, in the stage of production of the device, for testing the functionality thereof. Said testing can be carried out by introducing a fluid, such as air, under pressure into the auxiliary opening. Since the latter is in communication with the gap and with the control chamber, it is possible to simulate operation in a condition of safety of the device. Very advantageously, as has been mentioned previously, provision of the sealing means between the outer hose and the first connection body enables said testing to be carried out in the absence of a casing. Of course, in order to guarantee normal operation of the device, the auxiliary opening must be sealingly occluded. In a particularly advantageous embodiment, the closing element used for sealingly occluding the auxiliary opening belongs to a housing body of the device. In this way, when the aforesaid housing body is mounted, in the production stage, on the valve body that has already been assembled and tested, including also the sealing means and the two hoses, the aforesaid closing element is coupled or fitted into the auxiliary opening, sealing it without the need for an additional specific component.

In one embodiment, the device has a housing body that encloses at least partially the first connection body. Preferably, when said housing is present, at least one part thereof is configured for coupling with the outer surface of the outer hose. As will emerge clearly hereinafter, the outer hose used in the device according to the invention is preferably a corrugated hose, i.e., basically one having a cylindrical wall that defines a succession of crests and valleys. The housing body can thus envisage, in its opposite parts, formations in relief designed to engage with a corrugation of the outer hose, substantially with a shape fit. In this way, the outer hose is withheld mechanically in position with respect to the housing.

In one embodiment, the housing, when envisaged, can be made of two parts that are coupled on the valve body in a separable way. For this purpose, in a preferred embodiment, the two aforesaid parts consist basically of two half-shells made of a single piece and joined to one another by an elastically deformable hinge portion. In this way, the two half-shells can be closed on the first connection body and on the outer hose, and engaged to one another in a simple and fast way.

In one embodiment, the first connection body defines a first axially extended seat, slidably mounted in which is a stem of the valve member, as well as a second axially extended seat, slidably mounted in which is the control member, where the two seats are perpendicular and intersect. In said embodiment, the first seat includes an end opening that opens on the outside of the first connection body in a position substantially opposite to the valve member.

With this configuration, by exploiting the presence of the aforesaid opening, it is possible to restore operativeness of the device also after triggering of the safety mechanism, or bring back the valve member of the valve arrangement into its position for opening the duct of the first connection body, as will be described hereinafter.

In the embodiment currently deemed preferential, the control chamber is defined in part directly by the first connection body and is closed by means of the elastic diaphragm or other movable element. The control member preferably has a portion projecting from the diaphragm, on the outside of the control chamber, and coupled to the valve body is a cover or the like, having a passage for guiding the aforesaid projecting portion of the arrest member, with the diaphragm that is located in an intermediate position between the valve body and the cover.

BRIEF DESCRIPTION OF THE DRAWINGS

Further objects, characteristics, and advantages of the invention will emerge clearly from the ensuing detailed description, with reference to the annexed drawings, which are provided purely by way of explanatory and non-limiting example and in which:

FIGS. 1 and 2 are perspective views from different angles of an anti-flooding safety device according to an embodiment of the present invention;

FIGS. 3 and 4 are perspective views, from different angles, of a first connection body, or valve body, of the device of FIGS. 1 and 2;

FIGS. 5 and 6 are a view in rear elevation and a top plan view of the body of FIGS. 3 and 4;

FIGS. 7, 8, 9 and 10 are, respectively, a perspective view, a view in side elevation, a top plan view, and a plan view from beneath of a sealing member of the device of FIGS. 1 and 2;

FIG. 11 is a perspective view of the aforesaid first connection body with the aforesaid sealing member mounted thereon;

FIGS. 19, 20, 21, 22, 23, 24 and 25 illustrate, via schematic sectional views and corresponding details at a larger scale, a possible procedure for restoring operativeness of the device according to the invention following upon triggering of the safety mechanism;

FIG. 26 is a partially sectioned perspective view of a portion of a safety device in accordance with a preferred version of the invention;

FIG. 27 is a schematic cross-sectional view of the device of FIG. 26; and FIG. 28 is a detail at a larger scale of FIG. 27.

DETAILED DESCRIPTION OF PREFERRED EMBODIMENTS OF THE INVENTION

Figure 12:
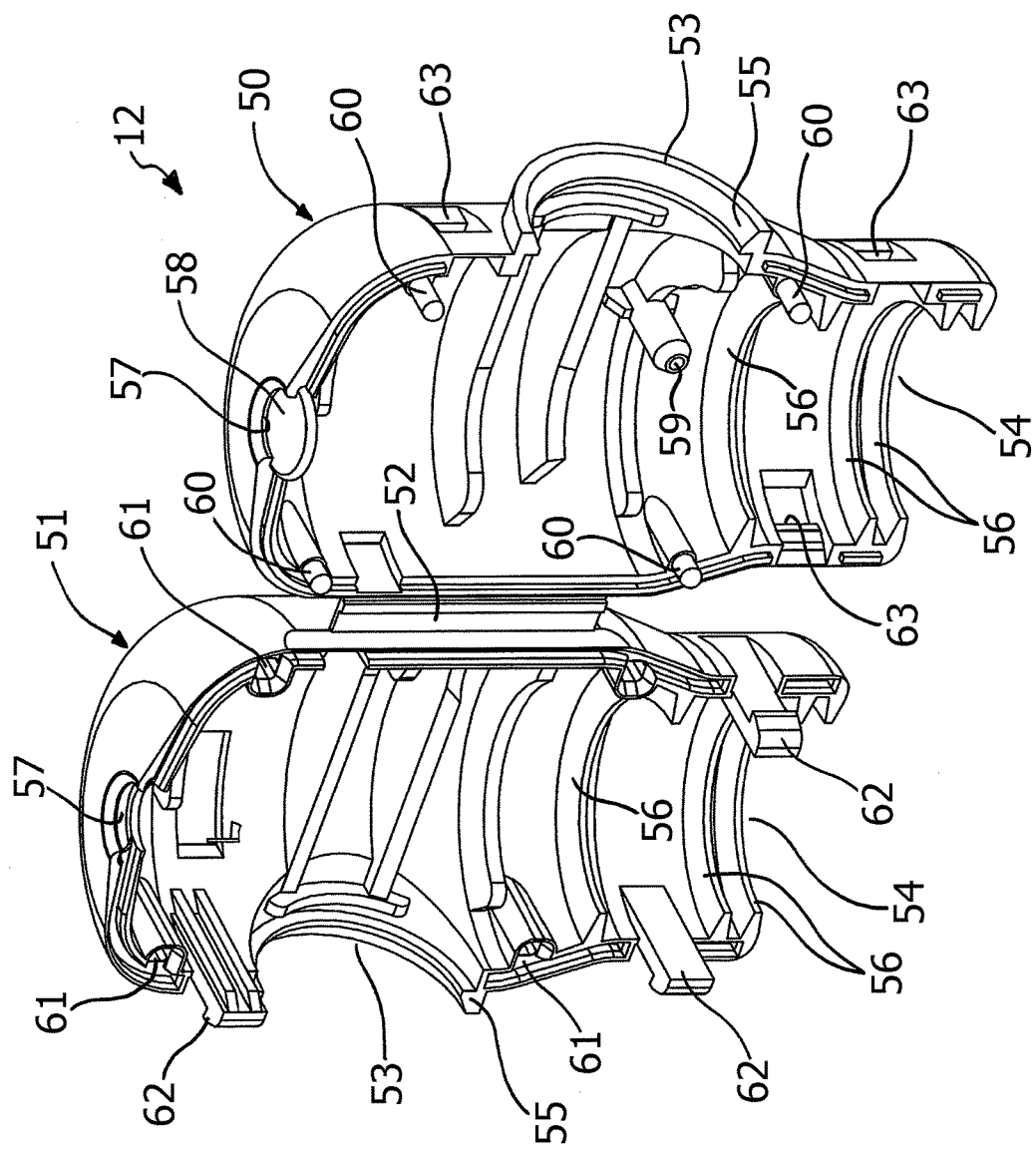
FIG. 12 is a perspective view of a housing body of the device of FIGS. 1 and 2.

Reference to "an embodiment" or "one embodiment" within the framework of the present description is intended to indicate that a particular configuration, structure, or characteristic described in relation to the embodiment is comprised in at least one embodiment. Hence, phrases such as "in an embodiment" or "in one embodiment" and the like, that may be present in different points of the present description, do not necessarily all refer to one and the same embodiment. Furthermore, the details, configurations, structures, or characteristics can be combined in any adequate way in one or more embodiments, even different from the ones exemplified. The references used in what follows are merely provided for convenience and do not define the sphere of protection or the scope of the embodiments.

It is pointed out that in the sequel of the present description and the attached claims, reference will be made merely for simplicity to leakage of fluid or water from the inner hose of the device, due, for example, to failure of the latter, this, however, including the case of leakage of a fluid or water that occurs in other parts of the device even in the absence of a failure of the inner hose (for example, a leakage of water between the inner hose and the valve body or the connection body, on account of yielding of the corresponding sealing means).

In FIGS. 1 and 2, designated as a whole by 1 is a safety device against leakage of a fluid, in particular an anti-flooding device, according to a possible embodiment of the present invention. As already described in the introductory part of the present description, the device 1 is of the type provided with a gap, which is closed also at the distal or bottom end and hence does not presuppose any particular pre-arrangement provided on a domestic appliance for the purposes of implementation of the safety function.

The device 1 basically comprises two end parts 2 and 3 and an intermediate part 4. In what follows, it is assumed that the upper end part 2 is designed for fluidic or hydraulic, as well as mechanical, connection to a suitable supply point of a source of the fluid itself, such as, for example, a water mains supply (not represented), whilst the lower part 3 is designed for fluidic or hydraulic and mechanical connection to the household appliance, such as an household appliance (not represented either). It should be noted, however, that the connection arrangement could be the reverse, i.e., with the part 2 connected to the household appliance and the part 3 connected to the source of the fluid.

The upper part 2 comprises a first connection body 20, defined hereinafter for simplicity as "valve body", associated to which are a pneumatically operated or hydraulically operated valve arrangement, sealing means described hereinafter, first connection means 11 (such as a ring-nut) for connection to the mains water supply, and a housing body 12 that encloses the valve body 20 at least partially. The lower part 3 includes a second connection body 13 with associated thereto corresponding second connection means 14 (such as a ring-nut) for connection to the household appliance, as well as some further components for fixing and sealing to the intermediate portion 4 that will be described hereinafter and that preferably comprise a bushing or lock ring 15. The intermediate part 4 basically consists of an inner hose (not visible in FIGS. 1 and 2), and an outer hose 16, such as a hose made of thermoplastic material. In the non-limiting embodiment illustrated, the outer hose 16 is a corrugated hose or hose with undulating wall, or with a substantially cylindrical wall that defines an alternation of crests and valleys, preferably annular and/or parallel to one another and/or arranged according to a regular series; the wall of the outer hose 16 could, on the other hand, have a continuous valley and crest, with a helical development, or other shape designed for the purpose. In the example described herein, the inner hose—designated hereinafter by 17 (see, for example, FIGS. 16 and 17) is preferably a cylindrical hose with a smooth surface, such as a hose made of thermoplastic material or elastomeric material, but said conformation is not to be understood as in any way limiting, in so far as also the inner hose 17 could be of a corrugated type, for example, with shapes of the type described for the outer hose 16. Preferably, the maximum external diameter of the inner hose 17 is smaller than the minimum internal diameter of the outer hose 16, in such a way that between them there is defined an annular gap, designated by 18, for example, in FIGS. 16 and 17. The gap 18 is designed to allow the leaking fluid to pass between the outer hose 16 and the inner hose 17, preferably also in an axial direction with respect to the two hoses, in particular towards the valve body 20.

Illustrated in FIGS. 3-6, with different views, is the aforesaid valve body 20, which comprises a body preferably made of injection-moulded thermoplastic material, where two substantially tubular portions 21 and 22 can basically be identified, defined hereinafter for simplicity as inlet portion and outlet portion, respectively, which in the example are orthogonal to one another. The two portions 21 and 22 include respective portion or stretches 23*a*, 23*b* of a main duct 23 for the fluid and are connected to each other at an intermediate body portion 24, inside which the two aforesaid stretches of duct intersect. The portion 21 defines an inlet 25 of the valve body 20, formed in the proximity of which is at least one flange; provided in the example illustrated are two formations with outer annular flanges 26, for assembly in a known way of the ring-nut 11 of FIG. 1. In the embodiment exemplified, moreover, the outer surface of the inlet portion 21 comprises a portion or stretch 27*a* tapered towards the intermediate portion 24, which, together with a further flange formation 27*b*, provides a sort of seat 27, designed to co-operate with the housing body 12, as will emerge hereinafter.

The outlet portion 22, which defines an outlet 28 of the valve body 20, has, in an upper region thereof, a series of axial projections 29, useful for reinforcement of the body 20 and/or possibly for positioning sealing means, described hereinafter.

A generally cylindrical lower region of the outlet portion 22 has coupling elements 22*a* on the outside, such as a series of annular retention teeth or projections, for coupling with an inlet region of the inner hose 17 of the device. Defined between said lower region and the lower end of the projections 29 is an sealing area of the portion 22, preferably with circular cross section, designated by 22*b* in FIGS. 3 and 6.

In the intermediate portion 24 of the valve body 20, and in particular in its upper area (as viewed in the figures), there is defined part of a substantially cup-shaped control chamber, designated by 30. At the upper end of said chamber 30, the valve body 20 is shaped to define an annular seat 31, designed to house at least the peripheral edge of a movable element described hereinafter, in particular an elastically deformable element, such as a diaphragm. Provided along the outer edge of the formation that defines the seat 31 are engagement seats 32, designed to couple with hooks or teeth of a cover, which is also described hereinafter.

In a generally central region of the chamber 30, an axially extended seat 33 is provided for an arrest member described hereinafter. Said seat 33 extends in the axial direction of the stretch 23*b* of the main duct 23 inside the outlet portion 22 of the valve body 20, preferably coaxial therewith. From FIG. 4 it may be noted how, within the portion 21 and the corresponding stretch 23*a* of the duct 23, there extends a massive body portion, designated by 34, defined in which is a sliding seat 35 for the stem of an open/close or valve member, as will be described hereinafter. As mentioned previously, the two stretches 23*a*, 23*b* of the duct 23 that extend in the portions 21 and 22 intersect one another at the body portion 24. Given the presence of the formation 34, in the area of intersection, the stretch of duct inside the inlet portion 21 is shaped like a half-ring, as may be appreciated, for example, in FIG. 17.

From FIG. 6 it may be noted how in the intermediate portion 24 of the valve body 20, in a position generally opposite to or facing the inlet portion 21, there is provided a hole or passage 36: said hole provides substantially a prolongation of the seat 35 for the valve member, for the functions that will be explained hereinafter.

From FIG. 6 it may likewise be noted how, in the intermediate portion 24 there is provided an attachment or connection 37, which extends axially in a direction generally parallel to the outlet portion 22 of the valve body 20 (as may be seen also in Figure 3). In said connection 37, there extends an axial passage 38 (visible in Figure 5), which opens on the inside of the chamber 30.

Preferably, operatively set between the outer hose 16 and the valve body 20 are sealing means. More in particular, and as will emerge more clearly hereinafter, these means provide a seal between a surface of the valve body 20, and in particular the outer surface 22*b* of the outlet portion 22 of the valve body 20, and at least one surface of the outer hose 16, and in particular an inner surface of the outer hose 16.

In the embodiment exemplified in FIGS. 7-10, the aforesaid sealing means comprise a sealing member having an overall annular or tubular shape, designated by 40, which will be defined hereinafter for simplicity as "gasket", said body being made of an elastically yielding material, preferably an elastomer. The gasket 40 comprises at least one portion or surface for coupling and/or sealing with respect to the valve body 20 and at least one portion or surface for coupling and/or sealing with respect to the outer hose 16.

Identified in the gasket 40, once again with reference to the figures, are an upper portion 41, an intermediate portion 42, and a lower portion 43. Rising from the upper portion 41 is a tubular part 44, the cavity of which proceeds within the body of the gasket 40 to form a connection passage 45, which opens substantially at the lower portion 43. The connection passage 45 preferably has at least two stretches with different section, such as a first stretch with circular section, which may be clearly seen in FIG. 9, and a second stretch with tapered or restricted section, which may be clearly seen in FIGS. 7 and 10. Preferably, the aforesaid first stretch is provided at least in part in the upper portion 41, and in particular at least in part in the tubular portion 44, whilst the aforesaid second stretch is made at least in part in the lower portion 43.

The tubular portion 44 can project radially from the main outer profile of the upper portion 41, as in the case exemplified, which proves useful for the purposes of coupling with the connection 37. Once again preferably, the diameter or the perimetral dimensions of the body of the gasket 40 basically decrease from the upper portion 41 towards the lower portion 43, which facilitates in particular coupling for sealing purposes between the valve body 20 and the outer hose 16.

As may be appreciated in particular from Figure 9, from the upper face of the portion 41 there branch off seats, in particular in the form of axial grooves or recesses 46, which are defined around the central passage 40a of the gasket 40 and extend possibly for a short stretch also in the intermediate portion 42. Preferably, but not necessarily, these grooves have an asymmetrical arrangement and/or irregular shape. The gasket 40 is designed to be fitted from beneath on the outlet portion 22 of the valve body 20 of FIGS. 3-6, with the recesses 46 that receive, preferably with elastic interference, the axial projections 29 of the aforesaid portion 22 of the valve body 20, also for the purpose of guaranteeing a precise relative positioning between the parts. In the mounted condition of the gasket 40, moreover, the connection 37 of the valve body 20 is fitted sealingly in the tubular portion 44 of the gasket, as may be clearly seen, for example, in FIG. 11. For the purposes of an elastic seal between the parts, the first stretch of the connection passage 45 has a smaller cross section than the external cross section of the connection 37.

To return to FIGS. 7-10, the body of the gasket 40 preferably has, in its intermediate portion 42, a shape and dimensions such as to determine a sealed coupling with respect to the outer hose, such as an external surface corrugation designed to provide an elastic coupling with the corrugation of the outer hose 16. Of course, since the body of the gasket 40 is made of elastic material, the crests and valleys of the corrugation of the intermediate portion 42 can be slightly larger, or have a larger size or diameter, than those of the corrugation of the outer hose 16, or of its internal diameter.

In one embodiment, the body of the gasket 40 has, preferably in its inner portion or central passage 40a, a shape and dimensions such as to determine a sealed elastic coupling with respect to the valve body 20, such as a diameter or size smaller than the diameter or size of the surface 22b of the outlet portion 22 of the valve body 20.

In any case, the arrangement is such that, after assembly of the gasket 40 on the valve body 20, a proximal-end portion of the outer hose 16 can be fitted with elastic interference on a portion of the gasket 40, in particular on the intermediate portion 42 of the gasket itself, so as to obtain substantially a shape coupling or complementary coupling between the parts.

With particular reference to FIG. 8, it may be noted how provided in the peripheral face of the upper portion 41 of the gasket 40 is an auxiliary opening 47, which forms the inlet of an auxiliary passage 48, which also opens in a region corresponding to the lower portion 42 of the gasket 40, as may be clearly seen in FIG. 10. Said auxiliary opening 47 preferably has a tapered shape and is hence wider for at least one stretch than the cross section of the duct 48.

It may be noted that the lower portion 43 of the gasket 40 in use faces the inside of the gap 18 defined between the outer hose 16 and the inner hose of the safety device, as described hereinafter. As will emerge more clearly in what follows, the auxiliary opening 47, with the corresponding auxiliary passage 48, are used for testing the device 1 in the production stage.

As has been said, in use, the gasket 40 is fitted on the outlet portion 22 of the valve body 20 and slid thereon until engagement is obtained between the axial projections 29 (FIG. 3) and the recesses 46 (FIG. 9), as well as engagement of the sealing area 22b of the valve body 20 with the bottom portion of the passage 40a of the gasket 40. The aforesaid area 22b and the corresponding portion for sealing the passage 40a have profiles that are at least approximately circular, or in any case preferably without projections and troughs, in order to guarantee an optimal radial seal. Following upon said assembly, as may be seen in FIG. 11, fitted in the tubular portion 44 of the gasket 40 is the bottom end of the connection 37 of the intermediate portion 24 of the valve body 20.

In this way, as may be appreciated, the inside of the control chamber 30 is in fluid communication, via the passage 38 of FIG. 5, with the passage 45 of the gasket 40 (see FIG. 7 or FIG. 9), and hence with the gap between the two hoses. According to a variant not represented, the connection 37 and the passage 38 can traverse entirely the passage 45 of the gasket 40, as far as the gap, being appropriately shaped for the purpose. The sealing means represented by the gasket 40 thus enable a triple hydraulic seal to be obtained, and in particular a first seal with respect to the outer hose 16, a second seal with respect to the valve body 20, and a third seal with respect to the inlet 37 of the control chamber 30.

From FIG. 11 it may likewise be noted how, in the condition where the gasket 40 is mounted on the valve body 20, the auxiliary opening 47 directly faces the outside, or is set radially with respect to the axis of the gasket 40 or of the valve body 20.

Illustrated in greater detail in FIG. 12 is the housing body 12, defined hereinafter for simplicity as "casing", which is designed to enclose partially inside it the valve body 20, as well as the gasket 40 with the associated portion of the outer hose 16. The casing 12 is preferably made of thermoplastic material or a material that is at least in part elastic.

In the embodiment exemplified, the casing 12 is configured in a single piece that defines two generally concave half-shells 50 and 51, joined to one another by an intermediate portion 52 that provides an elastic hinge. It may be noted that, in possible variant embodiments, the casing 12 can be made of two or more parts distinct from one another, then rendered fixed, for example, via respective hooks or screws, or via welding.

Along the edge of the half-shells 50, 51 opposite to the hinge portion 52 two first seats or recesses 53 are defined with a substantially semicircular profile; likewise, in the bottom portion of each half-shell 50, 51, two second seats or recesses 54 are defined, which also have a substantially semicircular profile. In this way, following upon closing of one half-shell on the other, in the casing 12 there are defined two circular passages, a lateral one and a lower one, the central axes of which are substantially orthogonal to one another. At the lateral recesses 53, the profile of the edge of the half-shells is shaped to define a semicircular projection or tooth 55. In the assembled condition of the device 1, the two teeth 55 couple with the seat 27 of FIG. 3 (see also FIG. 17) in order to guarantee a secure and centred positioning of the casing 12 with respect to the inlet portion 21 of the valve body 20 (preferably, thanks to the interaction between the inclined plane defined by the teeth 55 and the inclined plane defined by the tapered part of the seat 27 of Figure 3). The teeth 55 can possibly operate in a sealed way with respect to the valve body 20 and/or the seat 27; between the lateral recesses 53 and the valve body 20 there could, if necessary, be provided further sealing elements (not represented). The edge of the half-shells 50, 51 that defines the lower recesses 54 is generally tapered in order to obtain at least one semicircular projection 56, designed to engage in one of the valleys of the corrugation of the outer hose 16. Rising from the inner face of the half-shells 50, 51 are similar projections 56, designed for engagement with other valleys of the corrugation of the hose 16. In this way, in the assembled condition, the valve body 20 is coupled precisely from a mechanical standpoint to the outer hose 16. The projections 56 can possibly also operate in a sealed way with respect to the outer hose 16 (for example, the projections 56 can be rigid and pressed sealingly on an elastically yielding outer hose 16; between the projections 56 and the hose 16 there may possibly be provided further sealing elements, not represented).

In the top portion of the half-shells 50, 51, defined in the corresponding edge are two semicircular recesses 57, which provide an inspection window, for the purposes described hereinafter. Preferably, said window also includes a transparent closing element or inspection hole, designated by 58.

In variant embodiments (not illustrated), further sealing elements can be associated to or made of a single piece with the half-shells 50 and/or 51, in particular in order to define at least one mutual seal and/or a seal with respect to at least one of the valve body 20, the outer hose 16 and the element 58.

Once again with reference to FIG. 12, also in the inside part of the half-shells 50 and 51, in addition to possible other projections designed to co-operate with outer surfaces of the valve body 20, there is provided an axially extended projection 59, preferably cylindrical in shape, which constitutes a closing element of the auxiliary opening 47 of the gasket 40 (FIG. 9). In the assembled condition of the casing 12, i.e., with the two half-shells 50, 51 closed on one another and, set in between, the valve body 20, mounted on which is the gasket 40, the projection 59 penetrates with elastic interference into the auxiliary opening 47, stopping the corresponding passage 48. In a variant, the functions of the projection 59 are performed by a different closing element, distinct from the casing 12 but in any case designed to close the auxiliary opening 47 (such as, for example, a ball inserted in a forced way in the opening 47, with the latter preferably shaped for withholding the ball in position and determining a respective hydraulic, pneumatic, and mechanical seal).

In one of the two half-shells, in the example the half-shell 50, second projections or studs 60 are provided, designed for fitting in corresponding seats 61, provided in homologous positions on the other half-shell, here the half-shell 51. One of the two half-shells, preferably the half-shell that has the seats 61, has—along its edge—a plurality of hooks 62, here shaped like elastic teeth, designed for engagement in respective seats 63 provided in homologous positions on the other half-shell.

Figure 16:
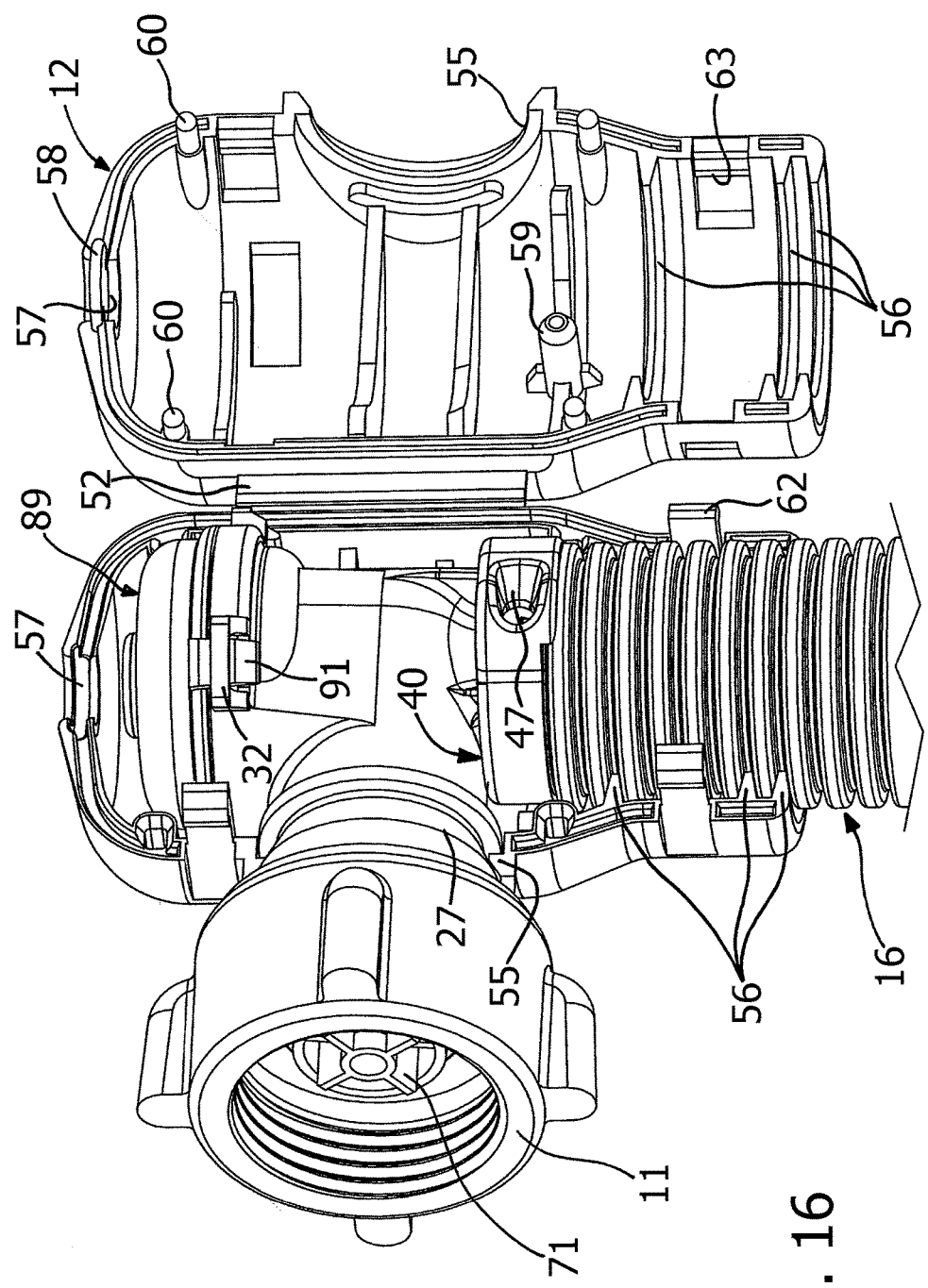
FIG. 16 is a view of the aforesaid first portion of FIGS. 13 and 14, in the partially assembled condition.

Shown in FIG. 16 is the partially assembled condition of the upper portion 2 of the device 1, with the casing 12 open. There may be noted the interference between the projections 56 of the half-shell 51 of the casing 12 with the corrugation of the outer hose 16, as well as the positioning of the gasket 40 with respect to the outer hose 16 itself, i.e., with the corresponding intermediate portion 42 and lower portion 43 that are within the proximal-end region of the hose. From said FIG. 16 it may likewise be noted how the auxiliary opening 47 is in a position such as to be stopped by the projection 59 when the two half-shells are closed on one another.

Figure 13:
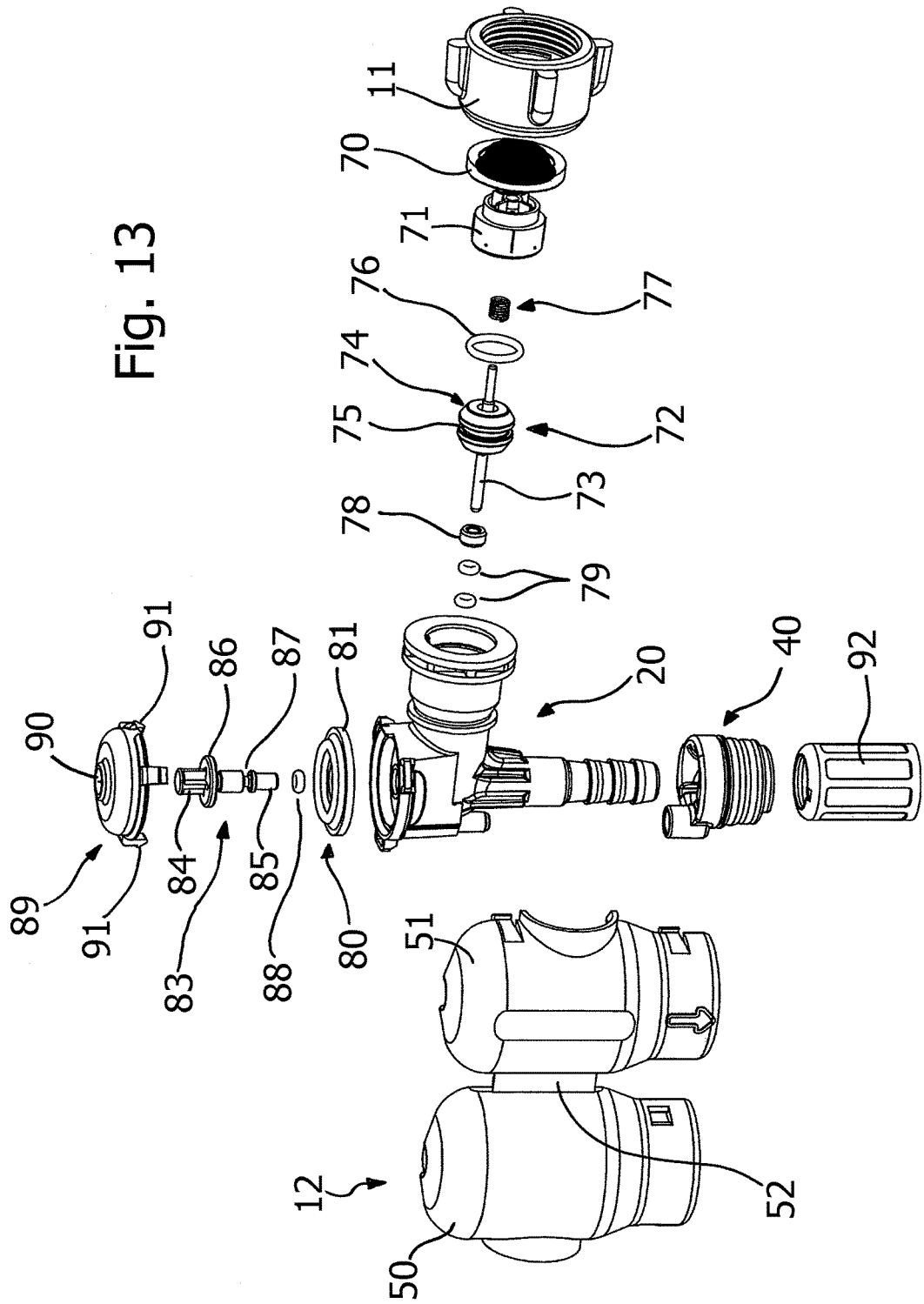
FIGS. 13 and 14 are two exploded views of a first portion of the device of FIGS. 1 and 2.
Figure 14:
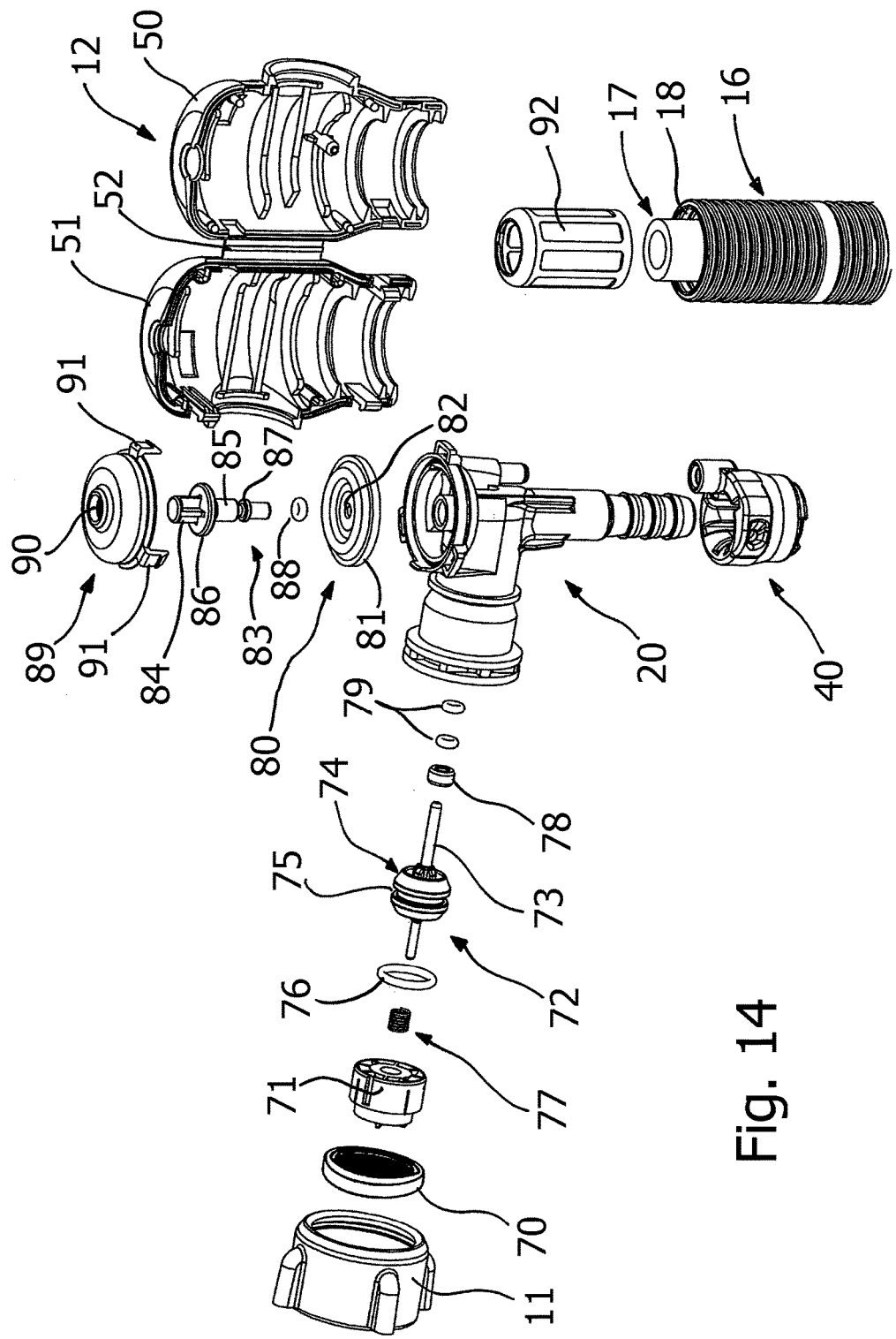

FIGS. 13 and 14 illustrate, with exploded views, components associated to the valve body 20. In said figures, designated by 11 is the ring-nut already referred to, having an internal thread, which constitutes an interface for mechanical and hydraulic connection of the body 20 to a supply point of the source of the fluid, such as a water mains supply. As has been said, said ring-nut 11 is of a type known in the sector, as are its modalities of anchorage to the valve body 20.

Designated by 70 is a filtering member, designed to obtain a filtration of the fluid entering the device 1. Also said member is of a type in itself known in the sector. The component designated by 71 is a diffuser member, designed to direct the fluid into the device 1. Also said member is of a generally known type, but is herein adapted to co-operate with the stem of a valve member forming part of the valve arrangement of the device 1. Possibly, upstream or downstream of the diffuser 71 there may be provided a flow regulator, for example, of the type having a diaphragm deformable under the pressure of the incoming water. The aforesaid valve member is designated as a whole by 72 and basically consists of an axially extended stem 73, provided in an intermediate area of which is a valve member 74, defining in an intermediate part thereof an annular seat 75 for a seal ring 76. The portion of the stem 73 that projects from the element 74 in the direction of the diffuser 71 is, in the assembled condition, inserted with possibility of sliding in an axial seat 71a of the diffuser itself, moreover housed in which is a spring 77, which provides a means for accumulating mechanical energy, designed to constantly force the valve member 72 towards the respective closed position, as will emerge hereinafter.

Designated by 78 is a guide bushing for the stem 73, whilst designated by 79 are two seal rings of an O-ring type, designed to provide a seal between the seat 35 of FIG. 4 and the aforesaid stem.

Designated as a whole by 80 is a movable element, which in the example illustrated is constituted by a diaphragm which can bend elastically, having substantially the shape of a disk and having a peripheral edge 81 and a central hole 82. The edge 81 is shaped to provide a sealed coupling within the seat 31 of FIG. 3, which surrounds the mouth of the control chamber 30 (see also FIG. 17).

The device includes control or retention means, which are designed to withhold the valve member 72 in a respective opening position and can be actuated for assuming a respective position of release of the valve member itself. For this purpose, in the example represented, designated as a whole by 83 is a control or retention member for the valve member 72, such as an axially extended arrest member, which comprises an upper portion 84, here with a cross-shaped cross section, and a longer lower cylindrical portion 85, located between which is a flange portion 86. Defined in the lower part 85 is an annular groove 87, for a corresponding sealing element 88, in particular an O-ring. In the assembled condition, the arrest member 83 is inserted with interference and/or seal within the central hole 82 of the diaphragm 80, in such a way that its lower cylindrical part 85 including the sealing element 88 is in turn inserted with possibility of sliding in the seat 33 defined centrally in the chamber 30 of the valve body 20 (see, for example, FIGS. 3, 6 and 17).

Designated by 89 is a fixing element or cover, which is designed to be coupled to the upper part of the valve body 20. The cover 89 is generally dome-shaped, with a central passage 90 that provides a guide for the axial movement of the arrest member 83. Provided along the peripheral edge of the cover 89 are engagement teeth 91, designed to couple in the corresponding engagement seats 32 defined in the upper part of the valve body 20 (see FIGS. 3 and 6). In the assembled condition, as may be noted in FIG. 17, the cover 89 thus withholds the peripheral edge 81 of the diaphragm 80 within the corresponding seat 31, with the diaphragm itself that is set between the valve body 20 and the cover, preferably in a condition of compression and/or seal of the peripheral edge 81. The upper portion 84 of the arrest member 83 projects, instead, on the outside of the control chamber 30 and is inserted in the passage 90 of the cover 89, which provides a guide therefor.

The fact that the upper portion 84 of the member 83 is inserted in the guide 90 and the bottom cylindrical part 85 of the member itself is inserted in the seat 33 constrains the member itself to perform a linear movement, also providing an indirect guide for bending of the elastic diaphragm 80.

Figure 17:
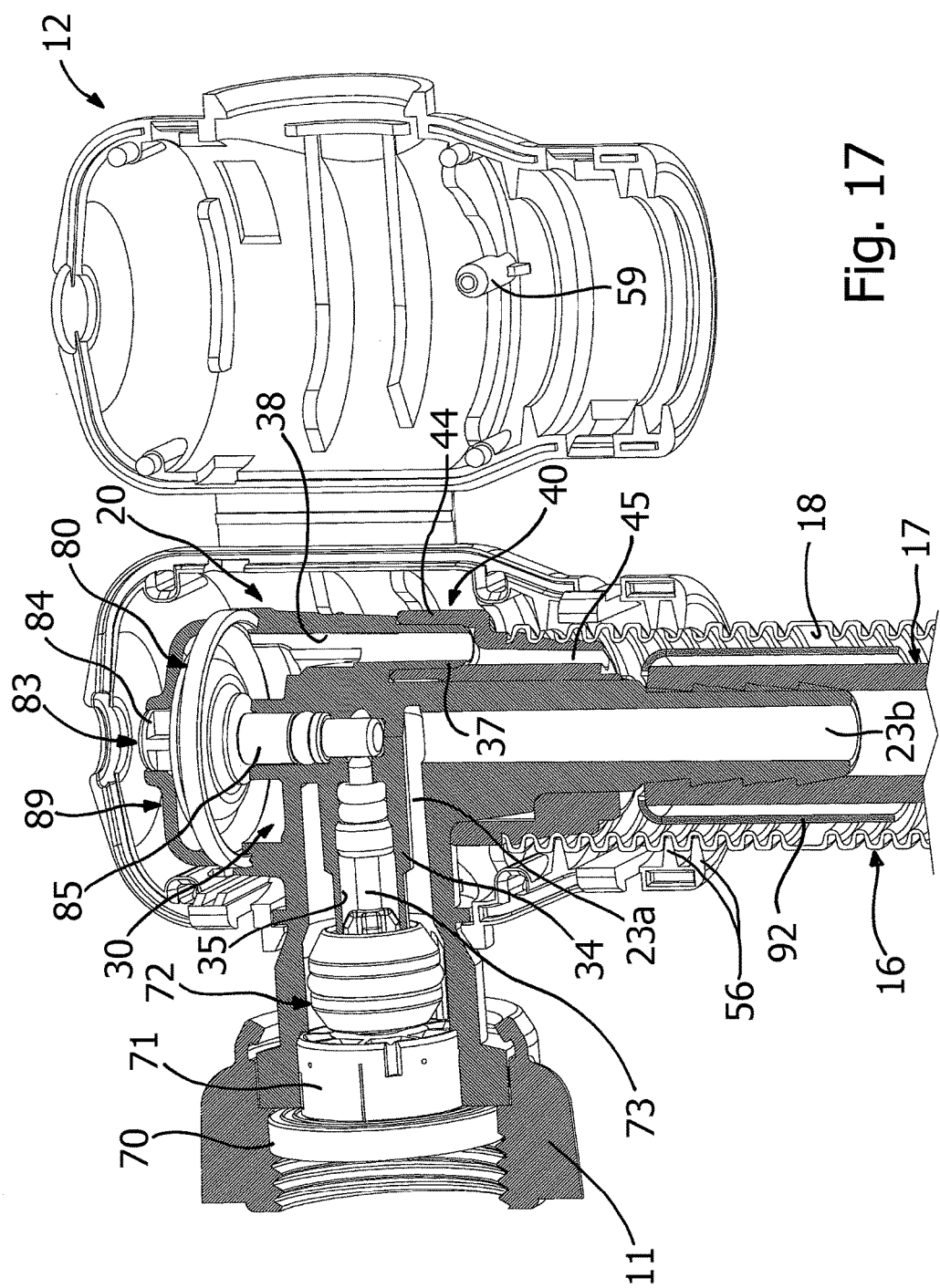
FIG. 17 is a view similar to that of FIG. 16 but with the first connection body and some elements associated thereto partially sectioned.

From FIG. 17 it may also be noted how, in the assembled condition, the top portion 84 of the member 83, and in particular its upper face, faces the window 57-58 of the casing 12. At least part of this upper portion 84 has an appropriate colouring, preferably different from that of the casing 12, to provide a visual warning system of the state of the device 1.

Once again in FIGS. 13 and 14, designated by 92 is a fixing or sealing bushing, designed to grip the inner hose 17 of the device mechanically on the toothed terminal part of the outlet portion 22 of the valve body 20, as may be seen, for example, in FIG. 17. Consider, however, that the fixing bushing 92, typically provided for an inner hose 17 of the aforesaid smooth type made of elastomer, can be replaced by another fixing element and/or seal, such as a sealing element made of elastomer overmoulded on an inner hose of some other type, for example, a corrugated hose made of thermoplastic or metal material.

Figure 15:
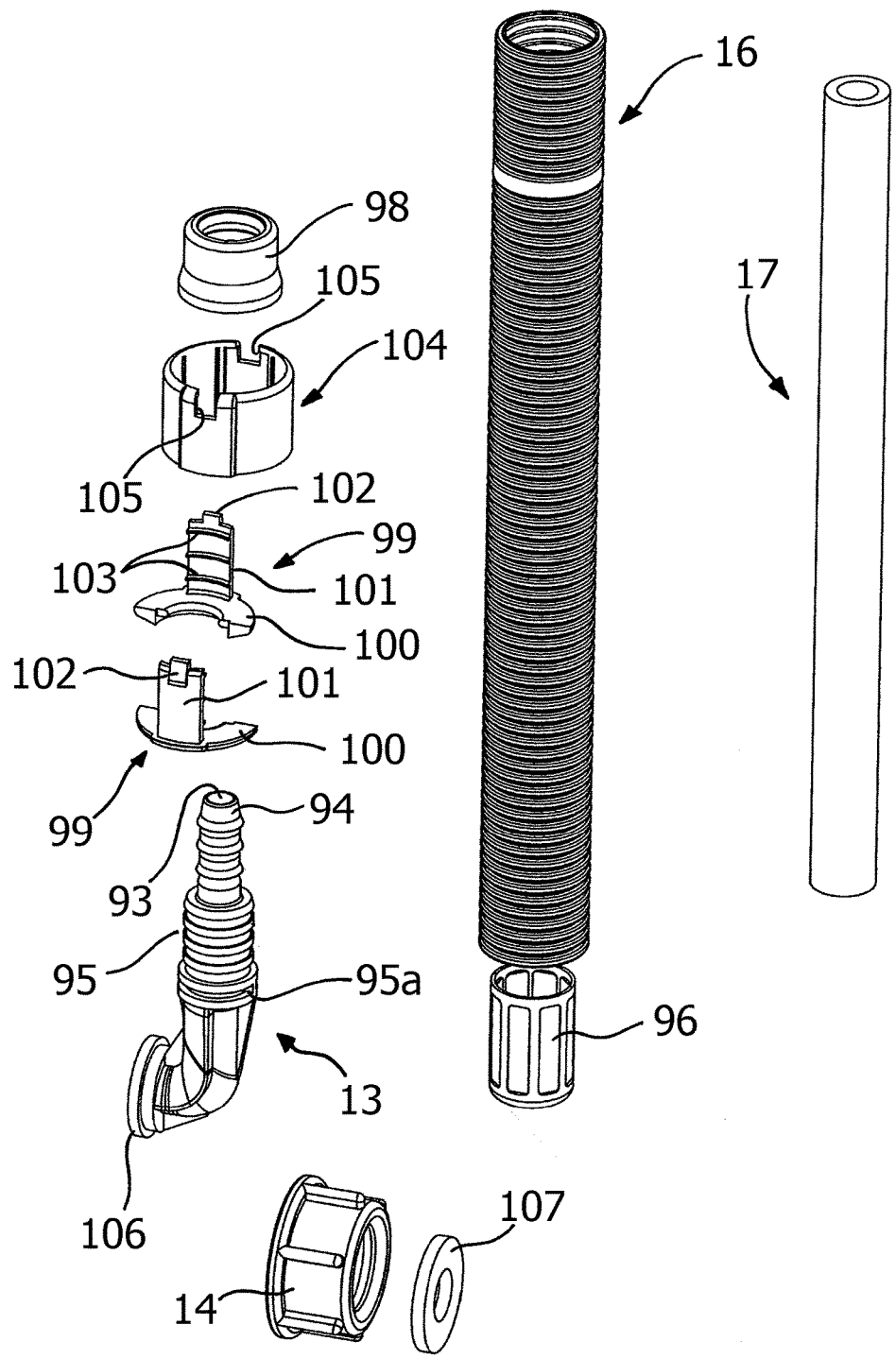
FIG. 15 is an exploded view of a second portion of the device of FIGS. 1 and 2.

FIG. 15 shows in part both the outer hose 16 and the inner hose 17. The materials used for producing the hoses 16 and 17 can be of a type known in the sector, for example, PP for the outer hose 16 and PVC or PP for the inner hose 17.

In FIG. 15, designated by 13 is the already mentioned second connection body, generally L-shaped and defining inside it a duct 93, having an inlet and an outlet, not shown.

Identified in the portion of greater length of the connection body 13 are a first portion 94, which has on the outside a series of annular retention teeth or projections, and an intermediate portion 95, provided with a surface corrugation. On the portion 94 there is to be fitted a distal or lower end region of the inner hose 17, which is then mechanically fixed in position by means of a ring or fixing or sealing bushing 96, similar to the one designated previously by 92 in FIGS. 13 and 14. It may be noted that also for the connection body 13 there may be provided means for coupling with respect to the inner hose 17, similar or equivalent to the ones described above with reference to the valve body 20.

On the intermediate portion 95 there is to be fitted a further elastically yielding sealing element, designated by 98, substantially shaped like a bushing and preferably having at least one internal corrugation, designed to couple with that of the outer surface of the portion 95. Then on the sealing element 98 there is to be fitted a terminal stretch of the outer hose 16, to provide a seal with respect to its inner surface and to close at the bottom the gap between the two hoses; as emerges also from FIG. 18, then, the sealing element 98 is operatively set between the body of the connection 13 and the outer hose 16.

There are then provided means for blocking also the outer hose 16 mechanically in position. For this purpose, defined at the lower end of the intermediate portion 95 of the body 13 are two semi-annular seats, one of which designated by 95a, in which retention elements 99 are to be coupled. Each retention element 99 has a base portion shaped like a half-ring, and a tab 101, which rises orthogonally from the base 100 and bears an engagement tooth 102. For the purposes of assembling, coupled in each seat 95 a is the half-ring 100 of a corresponding element 99 so that the tabs 101 are oriented upwards and set up against the outer hose 16 in diametrally opposite areas. The tabs 101, in their part facing the hose 16 have projections or corrugations 103, which mate with valleys of the corrugation of the hose 16, in particular to provide a mutual fixing. Next, a blocking bushing 15, previously slid over the outer hose 16, is slid downwards on the tabs 101, until the teeth 102 of the tabs 101 engage in respective seats 105 provided in the bushing 15. In this way, considering that the bushing 15 holds the retention elements 99 in position with respect to the connection 13 and to the outer hose 16, also the outer hose 16 is blocked mechanically with respect to the body of the lower connection body 13.

At its outlet end, the body 13 has a flange 106, which, in use, is set up against a plane gasket 107, withheld in position by the ring-nut 14 previously fitted on the connection 13. The arrangement of the ring-nut 14 and of the seal ring 107, as well as the corresponding modalities of coupling to the body of the connection 13 are of a type known in the sector.

Figure 18:
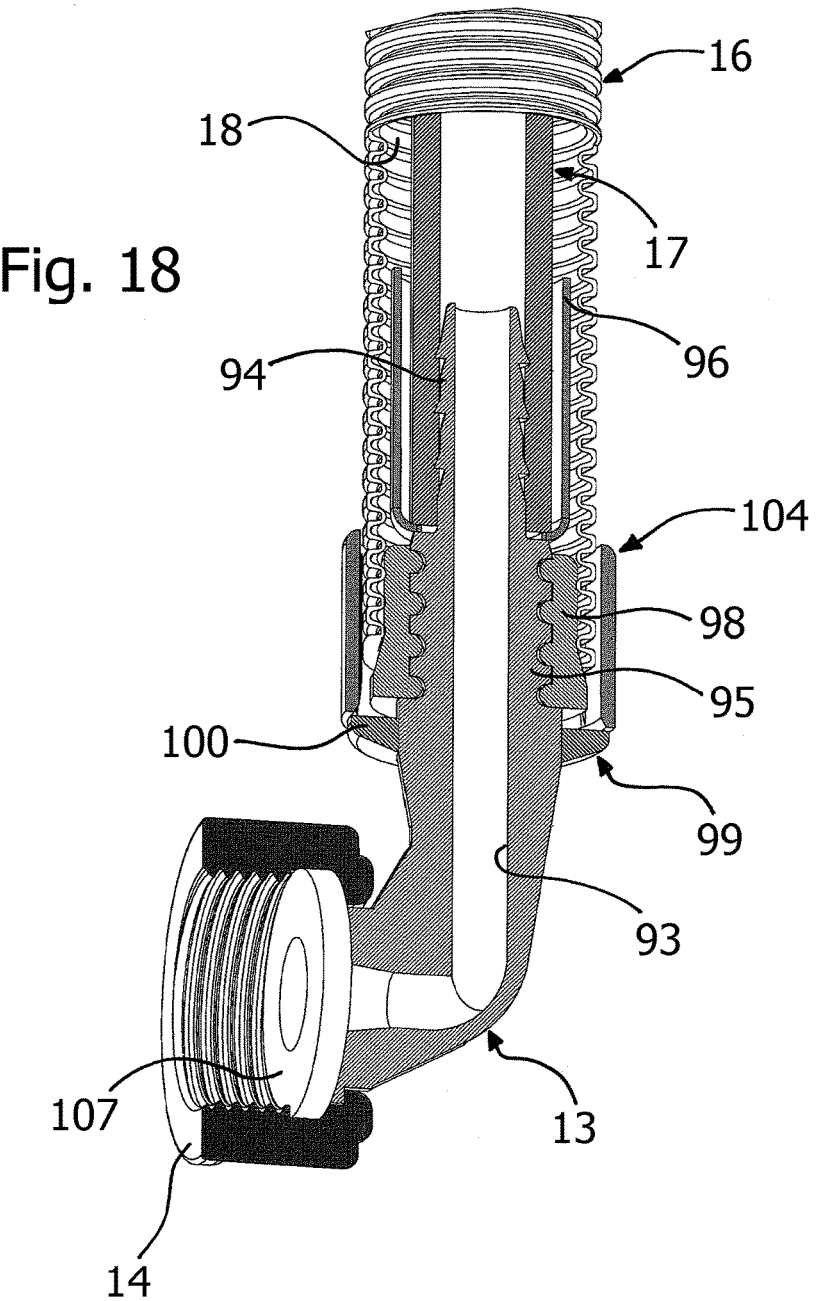
FIG. 18 is a sectioned view of the aforesaid second portion of FIG. 15.

Shown in FIGS. 17 and 18 is the condition where the basic parts of the safety device 1 are assembled. In said figures, in addition to the elements already previously shown, there may be clearly seen the gap 18 defined between the hoses 16 and 17. In the embodiment exemplified, the gap 18 has, as has been said, a substantially annular shape, or is defined by an albeit minimal distance between the inner hose 17 and the outer hose 16 (given that the external diameter of the hose 17 is preferably smaller than the internal diameter of the hose 16).

From FIG. 17 it may be clearly seen how the proximal end of the outer hose 16 extends beyond the proximal end of the inner hose 17, with the sealing means represented by the gasket 40 that are mounted on the valve body 20 in an area of the latter that is located at a distance in the axial direction, or further up, with respect to the proximal end of the hose 17, and hence in an intermediate area between the inlet and outlet of the valve body 20, also to the advantage of compactness of the device 1.

FIG. 17 illustrates the condition of normal operation of the device 1, where the water (or other fluid) at inlet from a threaded hydraulic attachment, secured on which is the ring-nut 11, can penetrate into the stretch of duct 23*a*, passing through the filter 70 and the diffuser 71. In said condition, the elastic diaphragm 80 is in a respective inoperative condition, where the arrest member 83 is in a generally lowered position. In said position, abutted on the arrest member 83 is the internal end of the stem 73 of the valve member 72. In this way, the valve member 72, and in particular its element 74, is kept in a position of opening of the duct 23, countering the action of the spring 77 of FIGS. 13 and 14 (not visible in FIG. 17).

In practice, then, the element 74 of the valve member is kept at a distance from the corresponding valve seat, defined in the surface of the stretch of duct 23*a*. In said condition, then, the fluid can traverse the stretch of duct 23*a* and then pass into the stretch of duct 23*b*, which traverses the outlet portion of the valve body 20 axially, to pass into the inner hose 17. At the distal end of the inner hose 17, the fluid penetrates then into the internal duct 93 in the bottom connection 13 to reach the household appliance.

In the case of a leakage of fluid inside the device, for example, from the inner hose following upon a failure thereof, there is a passage of water in the gap 18. As explained previously, the space defined by the gap 18, by the passages 44-45 and 48 of the gasket 40, and by the control chamber 30, with the corresponding passage 37-38, is a substantially closed volume (taking into account what is described hereinafter with reference to FIGS. 26-28), designed to convey and contain the leakage of fluid without any fluid coming out of the device, at least in the time elapsing between leakage and triggering of the valve arrangement. In use, the passage 48 of the gasket is stopped by the projection 59 of the housing body 12; consequently, the leakage of water that penetrates into the gap 18 is such as to cause an increase in pressure within the aforesaid volume.

This increase in pressure is transferred, through the passage 44-45 of the gasket 40 and the corresponding duct 37-38 of the valve body 20, within the control chamber 30. The increase in pressure in the chamber 30 brings about elastic bending of the diaphragm 80 upwards, and hence raising of the arrest member 83. Said raising of the member 83 has the effect of freeing the stem 73 of the valve member 72, which then, under the action of the corresponding spring 77, passes into the condition of closing of the main duct, and in particular of the stretch of duct 23*a*. In this way, any further inflow of water inside the device 1, and hence towards the household appliance, is prevented. Preferably, the mechanism is such as to ensure safe or stable operation, namely, an actuation of the valve member into the closing position that cannot be restored or modified autonomously, for example, on account of a reduction of pressure of the fluid in the gap 18 and/or in the control chamber 30.

Given the raising of the diaphragm 80, and hence of the arrest member 83, the upper portion 84 of the latter, guided by the passage 90 of the cover 89, reaches, or at least approaches, the window 57-58 defined in the top face of the casing 12; as mentioned previously, the colouring of the upper portion 84 of the member 83 is preferably different from that of the casing 12, so that the varied position of the member 83 is more easily perceptible from outside the casing, through the window 57-58. The user, in this way, can detect actuation of the safety device 1, or its triggering for interrupting the inflow of water towards the household appliance.

As has been mentioned, in certain conditions of installation—for example, with the device mounted substantially horizontally, or else vertically and with the valve body 20 in a lower position, or connected to the household appliance, instead of to the source of the fluid—it is possible that it is the leaking fluid itself that reaches the control chamber 30 and causes bending of the diaphragm 80, with the consequent displacement of the arrest member 83.

From what has been described previously, it will be appreciated that the safety device 1 according to the invention is perfectly able to function also in the absence of the casing 12 provided that the auxiliary opening 47 of the gasket 40 is stopped in some way. Said auxiliary opening 47 is provided to enable testing of the device 1 in the production stage. For this purpose, prior to assembly of the casing 12, it is sufficient to inject air into the auxiliary opening 47 and into the passage 48 of the gasket 40 in such a way as to cause an increase of pressure within the substantially closed volume referred to previously. Said increase in pressure brings about bending of the diaphragm 80 and hence raising of the arrest member 83, as explained previously, thus simulating triggering of the safety mechanism of the device 1. Once proper operation of the device 1 has been verified, the condition of opening of the main duct 23 must be restored. This can be obtained by freeing the auxiliary opening 47 and causing recession of the valve member 72 towards the corresponding original position; for this purpose, in a particularly advantageous embodiment of the invention, the valve body 20 has the hole or passage 36 illustrated in FIG. 6.

In particular, as may be seen in Figures 19-20, in the passage 36 there can be inserted a suitable tool 200 having a front portion 201 of diameter or cross section smaller than that of the stem 73 of the valve member 72. In the example represented, the tool 200 is a prevalently cylindrical rod, and its portion 201 has a substantially semicircular cross section. In the example represented, the tool 200 is pushed into the passage 36, with the aforesaid front portion 201 at the bottom. In this way, the stem 73 of the valve member 72 can be pushed towards the position of opening of the duct 23, as may be seen in FIGS. 21-22. When said position is reached, via a further tool 202 (or else manually, given the absence of the casing 12 or the fact that the casing is open), it is possible to press the member 83 from the top downwards, in particular by acting on its upper portion (designated by 84 in FIG. 17). There is thus obtained a first lowering of the arrest member 83, the lower end of which can at a certain point come to rest on the front portion 201 of the tool 200, as may be seen in Figures 23-24. In said condition, the lower part of the arrest member 83 already faces and engages an upper area of the section of the stem 73. In this step, the valve member 72 is then already blocked open, and it is possible to continue to press the member 83 from above downwards while the implement 200 is being extracted. In this way, when the front portion 201 of the implement 200 is disengaged completely from the arrest member 83, the latter can be pushed completely downwards as far as its initial position (visible in FIG. 17 or FIG. 25), or with the arrest member 83 that engages the stem 73 in a significant and stable way. As may be seen, with the arrangement illustrated, also testing of the safety device 1 is very simple. It goes without saying that one or more tools of the type referred to, or in any case designed for the purpose, can be used to restore operation of the device 1 also in other cases, it being possible of course for the tools also to have shapes different from those exemplified herein and/or to form part of an automatic testing system or machine.

It should be noted that the hole 36 is isolated from the fluid, via the sealing elements represented by the O-rings 79 and 88 that operate on the stem 73 and the member 83 and can thus remain open. However, for greater safety, in possible variant embodiments there may be envisaged also a suitable plug for the hole 36, for example, of a spherical shape.

In a version of the invention considered preferential, there is provided a venting micro-duct, of dimensions such as to allow venting of the air from the gap 18, but without allowing outlet of a significant amount of water from the device, at least in the time elapsing between a leakage and triggering of the valve arrangement. Said micro-duct is preferably defined at least in part in at least one of the valve body 20 and the connection body 13, even though it should not be ruled out that it can be obtained at least partially in at least one of the body of the gasket 40 and the body of the sealing element 98.

Said micro-duct is particularly advantageous for preventing risks of defectiveness, and in particular for preventing the occurrence during storage of the device 1 of any anomalous actuation thereof, caused by the increase of internal pressure due to variations of ambient temperature, in particular following upon warming.

In the example illustrated in FIGS. 26-28, the aforesaid micro-duct, designated by 210, is provided on the valve body 20, in particular in the area 22b on which the gasket 40 is designed to operate to provide tightness. As may be noted, the micro-duct 210 is basically constituted by an axial groove formed in the area 22b of the portion 22 of the valve body, having a length such as to project beyond the gasket 40—or at least open beyond its sealing portion—both at the bottom (and hence in communication with the gap 18) and at the top (and hence in communication with the space existing between the casing 12 and the valve body 20, which is at ambient pressure). As has been said, the micro-duct 210 is calibrated to enable a modest venting of air, but without causing any significant amount of water to come out, and for this purpose its maximum dimension of cross section or depth S (FIG. 28) is very small, roughly less than 0.5 mm, and in particular less than 0.2 mm. Preferably, also the maximum dimension of width L (FIG. 28) is very small, roughly less than 1 mm, and in particular less than 0.4 mm.

The dimensions of the micro-duct 210 are in any case such as not to bring about a venting that would prevent an increase in pressure within the gap 18 and/or the control chamber 30 in the event of leakage; namely, the possible presence of the micro-duct 210 is such as not to prevent operation of the device following upon leakage or faults, such as the failure of the inner hose 17 or a significant leakage of fluid from sealing elements.

The foregoing description, which refers to the micro-duct 210, constitutes a possible example of what was said previously as regards a substantially closed chamber, or gap, or volume, i.e., one not perfectly hermetic.

From the foregoing description the characteristics of the present invention, as likewise the advantages that it affords, emerge clearly. It is clear that for the person skilled in the art numerous variants are possible of the anti-flooding safety device described herein by way of example, without thereby departing from the scope of the invention, as defined by the annexed claims.

The portions 21 and 22 of the valve body 20 and of the corresponding passages of the casing 12 can have a relative arrangement different from the substantially orthogonal one described and illustrated herein, preferably an angular arrangement comprised between an orthogonal arrangement and an axial arrangement of the portions 21 and 22.

The invention has been described with particular reference to a safety device against leakage of water, but it will be appreciated that the solution may be used also for the control of leakage of other fluids used in household appliances, for example, gas.

According to a further variant (not represented), it is possible to define directly in the valve body a testing passage having purposes similar to those of the opening designated previously by 47 and 48, in direct communication with the gap or else with the control chamber. In said embodiment, the testing passage can be sealed, after testing, with a closing element, such as a ball forced into place, or else by means of an element belonging to the casing 12 or carried thereby, having a function similar the one designated above by 59 (for example, an element made of elastic material mounted on a rigid projection of the type designated previously by 59).

The first sealing means, such as the gasket 40, can possibly be associated to the valve body via a moulding of elastomeric material, such as an over-moulding or co-moulding. Moreover, first sealing means, such as the gasket 40, can, if necessary, be configured for operating or being set between the valve body 20 and an end portion and/or an external area of the hose 16. Similar considerations apply to the sealing element 98 of the connection 13.

In a possible embodiment, at least one of the sealing elements 40 and 98 is co-moulded with the inner hose, in particular a corrugated inner hose, where said at least one element also provides a seal with respect to the ends 22a or 94 of the bodies 20 or 13, mounted on which is the inner hose 17.

In a possible variant, the valve arrangement of one of the connection bodies is conceived with the corresponding valve member designed to pass into the respective closing position under the thrust of the incoming fluid, it then being engaged in said position by suitable retention means.

As has been mentioned previously, the structure of the valve member 72, including the corresponding stem 73 and the element 74, can be made of a single piece. The corresponding sealing means 76 may even be overmoulded on said structure. Likewise, also the sealing means 88 of the arrest member 83 can be moulded on the latter. Possibly, also the body of the diaphragm 80 can be moulded on the body of the arrest member 83. In general terms, one or more parts, such as the various sealing elements, may be overmoulded on or co-moulded to rigid bodies of the device, such as the connection bodies 13 and 20.

In the example illustrated, the part 2 of the device 1 is provided for connection to the source of the fluid, whilst the part 3 is provided for connection to the household appliance. As already said, on the other hand, a reverse configuration is possible, i.e., with the part 2 connected to the household appliance and the part 3 connected to the source of the fluid (and hence to the valve body 20 at the outlet end of the device). It is also possible to provide both the connection body 13 and the connection body 20 with a respective valve arrangement of the type described previously.

The invention claimed is:

1. A safety device against fluid leaks for household appliances, configured for connection between a source of the fluid and a household appliance, comprising:

a first connection body and a second connection body, which define a first duct and a second duct for the fluid, respectively;

a valve arrangement including a valve member mounted on the first connection body and configured to assume a position of opening and a position of closing of the first duct, and means for accumulating mechanical energy to force the valve member towards the position of closing of the first duct;

control means, for withholding the valve member in the position of opening, countering the action of the means for accumulating mechanical energy, the control means being operable for assuming a respective position of release of the valve member;

a flexible inner hose and a flexible outer hose which are impermeable to the fluid, wherein the inner hose connects in fluid communication the first duct and the second duct and extends longitudinally at least in part within the outer hose, such that between at least part of the two hoses a gap having a proximal end and a distal end is defined, the gap being substantially closed at said ends for withholding therein possible leaking fluid, wherein the first connection body comprises a control chamber with a movable element, wherein the control means comprise a control or retention member associated to the movable element, wherein the gap is in fluid communication with the control chamber to form therewith a substantially closed volume, such that an internal fluid leak towards the gap or the substantially closed volume causes a movement of the movable element, and thereby an actuation or displacement of the control member to the corresponding position of release of the valve member, in which the valve member is free to assume the position of closing of the first duct, wherein the movable element consists of an elastically deformable element which delimits at least in part the control chamber and is capable of bending between an inoperative position and an operative position, and wherein the control member is coupled to the deformable element such that a bending of the deformable element from the inoperative position into the operative position causes a displacement of the control member towards the position of release.

2. The device according to claim 1, wherein:
the elastically deformable element is a diaphragm, and
the first connection body is shaped to define an annular seat at the upper end of the control chamber, prearranged for housing at least a peripheral edge of the diaphragm.

3. The device according to claim 1, comprising first sealing means, operatively arranged between the outer hose and the first connection body and defining a connection passage for connecting the gap to the control chamber.

4. The device according to claim 3, wherein the first sealing means comprise a substantially annular sealing member, which is sealingly coupled on at least one portion of the first connection body and on which there is in turn sealingly coupled a proximal-end portion of the outer hose.

5. The device according to claim 1, wherein the first duct comprises a first axially extended portion and a second axially extended portion that extend substantially perpendicular to each another or according to an angular arrangement comprised between an orthogonal arrangement and an axial arrangement.

6. The device according to claim 1, wherein the valve member can be displaced between the respective position of opening and position of closing in a direction substantially perpendicular to an axis of the inner hose or of a proximal end thereof.

7. The device according to claim 1, comprising a housing body, which encloses at least partially the first connection body.

8. The device according to claim 7, wherein at least one portion of the housing body is configured for coupling with an outer surface of the outer hose.

9. The device according to claim 1, wherein:
the first connection body defines a first axially extended seat, in which a stem of the valve member is slidably mounted, and a second axially extended seat, in which the control member is slidably mounted, where the two seats are substantially perpendicular and intersect one another.

10. The device according to claim 1, wherein at least one of:
the first connection body defines one part of the control chamber;
the control member has a portion projecting from the movable element outside the control chamber;
a cover is coupled to the first connection body, having a passage for guiding a projecting portion of the control member; and
the movable element is in an intermediate position between the first connection body and the cover.

11. A safety device against fluid leaks for household appliances, configured for connection between a source of the fluid and a household appliance, comprising:
a first connection body and a second connection body, which define a first duct and a second duct for the fluid, respectively;
a valve arrangement, including a valve member mounted on the first connection body and configured to assume a position of opening and a position of closing of the first duct;
control means, for withholding the valve member in the position of opening, the control means being operable for assuming a respective position of release of the valve member;
a flexible inner hose and a flexible outer hose which are impermeable to the fluid,
wherein the inner hose connects in fluid communication the first duct and the second duct and extends longitudinally at least in part within the outer hose, such that between at least part of the two hoses a gap having a proximal end and a distal end is defined, the gap being substantially closed at said ends for withholding therein possible leaking fluid,
wherein the first connection body comprises a control chamber that is at least in part delimited by a movable element,
wherein the control means comprise a control or retention member associated to the movable element,
wherein the gap is in fluid communication with the control chamber to form therewith a substantially closed volume, such that an internal fluid leak towards the gap or the substantially closed volume causes a movement of the movable element, and thereby an actuation or displacement of the control member to the corresponding position of release of the valve member, in which the valve member is free to assume the position of closing of the first duct, wherein the control member has an indication portion which projects from the movable element, the indication portion being arranged to extend outside the control chamber and being at least in part visible through a window of a housing body, into which the first connection body is at least in part contained, to supply indication of an operating state of the device.

12. A safety device against fluid leaks for household appliances, configured for connection between a source of a fluid and a household appliance, comprising:

a first connection body and a second connection body, which define a first duct and a second duct for the fluid, respectively, the first connection body having a control chamber;

a valve arrangement, which includes a valve member mounted on the first connection body and configured to assume a position of opening and a position of closing of the first duct, a flexible inner hose and a flexible outer hose which are impermeable to the fluid, wherein the inner hose connects in fluid communication the first duct and the second duct and extends longitudinally within the outer hose, such that between at least a part of the two hoses a gap having a proximal end and a distal end is defined, the gap being substantially closed at said ends for withholding therein possible leak fluid, and a substantially annular sealing gasket having a body made of an elastically yielding material operatively arranged between the outer hose and the first connection body, the body of the sealing gasket having an outer profile and an inner profile and defining, in an intermediate region thereof comprised between the outer profile and the inner profile, a connection passage for putting in fluid communication the gap and said control chamber, wherein the inner profile of the body of the sealing gasket is defined by a central passage thereof, shaped and dimensioned to determine a sealed elastic coupling with respect to at least one portion of the first connection body, and wherein the outer profile of the body of the sealing gasket is sealingly coupled with respect to a proximal end portion of the outer hose.

13. The device according to claim 12, wherein the outer hose is corrugated at least at said proximal end portion and at least one part of the sealing gasket is capable of obtaining a shape-coupling with an inner surface of said proximal end portion of the outer hose.

14. The device according to claim 13, wherein said one part of the sealing gasket has an outer surface corrugation capable of sealingly couple with a corrugation of said proximal end portion of the outer house.

15. The device according to claim 12, wherein at least one of:

the sealing gasket has an upper portion, a lower portion, and an outer diameter, the outer diameter of the sealing gasket substantially decreasing from the upper portion towards the lower portion;

the sealing gasket is capable of obtaining a first sealing with respect to the outer hose, a second sealing with respect to a first portion of the first connection body and a third sealing with respect to a second portion of the first connection body.

16. The device according to claim 12, wherein the first connection body defines an auxiliary duct which opens in said control chamber, to which an outlet of the connection passage of the sealing gasket is sealingly coupled, an inlet of the connection passage being open towards the gap.

17. The device according to claim 12, wherein the sealing gasket has an auxiliary opening which is in fluid communication with the gap, the auxiliary opening facing outside the sealing gasket and being capable to be sealingly closed by a corresponding closure element.

18. The device according to claim 12, wherein the connection passage includes at least one of:

at least two stretches having a different section, a first stretch having a circular section and a second stretch having a tapered or restricted section; and one tubular portion of the sealing gasket, configured for coupling with an inlet of said chamber.

19. The device according to claim 17, wherein the closure element belongs to a housing of the first connection body.

20. A safety device against fluid leaks for household appliances, configured for connection between a source of a fluid and a household appliance, comprising:

a first connection body and a second connection body, which define a first duct and a second duct for the fluid, respectively;

a valve arrangement, which includes a valve member mounted on the first connection body and configured to assume a position of opening and a position of closing of the first duct, a flexible inner hose and a flexible outer hose which are impermeable to the fluid, wherein the inner hose connects in fluid communication the first duct and the second duct and extends longitudinally within the outer hose, such that between at least a part of the two hoses a gap having a proximal end and a distal end is defined, the gap being substantially closed at said ends for withholding therein possible leak fluid, and first sealing means, operatively arranged between the outer hose and the first connection body and defining a connection passage for putting in fluid communication the gap and a chamber of the first connection body, wherein the first sealing means is configured for obtaining a first sealing with respect to an inner surface the outer hose, a second sealing with respect to a first outer portion of the first connection body and a third sealing with respect to a second outer portion of the first connection body.

* * * * *